United States Patent
Bekku

(10) Patent No.: US 8,573,792 B2
(45) Date of Patent: Nov. 5, 2013

(54) REFLECTIVE MIRROR FOR SOLAR THERMAL POWER GENERATION

(75) Inventor: Hiroshi Bekku, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 146 days.

(21) Appl. No.: 13/256,746

(22) PCT Filed: Feb. 4, 2010

(86) PCT No.: PCT/JP2010/051601
§ 371 (c)(1), (2), (4) Date: Sep. 15, 2011

(87) PCT Pub. No.: WO2010/106844
PCT Pub. Date: Sep. 23, 2010

(65) Prior Publication Data
US 2012/0002311 A1    Jan. 5, 2012

(30) Foreign Application Priority Data
Mar. 18, 2009    (JP) ................. 2009-066237

(51) Int. Cl.
G02B 5/08    (2006.01)
(52) U.S. Cl.
USPC .......................................... 359/883
(58) Field of Classification Search
USPC ............................... 359/883, 884
See application file for complete search history.

(56) References Cited

U.S. PATENT DOCUMENTS

2007/0223121 A1    9/2007    Franck et al.

FOREIGN PATENT DOCUMENTS

| JP | 11-125708 A | 5/1999 |
| JP | 2004-77643 A | 3/2004 |
| JP | 2005-106432 A | 4/2005 |
| JP | 2008-165094 A * | 7/2008 |
| JP | 2008-233838 A | 10/2008 |
| JP | 2008-249166 A | 10/2008 |
| WO | WO 2007/108861 A1 | 9/2007 |

OTHER PUBLICATIONS

International Search Report dated Mar. 9, 2010 issued in International Appln. No. PCT/JP2010/051601.

* cited by examiner

*Primary Examiner* — Euncha Cherry
(74) *Attorney, Agent, or Firm* — Holtz, Holtz, Goodman & Chick, PC

(57) ABSTRACT

Disclosed is a reflective mirror for solar thermal power generation comprising a metal film and provided thereon, a substrate, the reflective mirror reflecting sunlight entering from a substrate side, featured in that the substrate is a film composed of a resin containing microfibrillated cellulose. The reflective mirror maintains a light collecting ability, particularly a specular reflectance highly and stably against variation of weather conditions, when sunlight is collected outdoors, is usable over a long period of time, and has high durability.

19 Claims, 1 Drawing Sheet

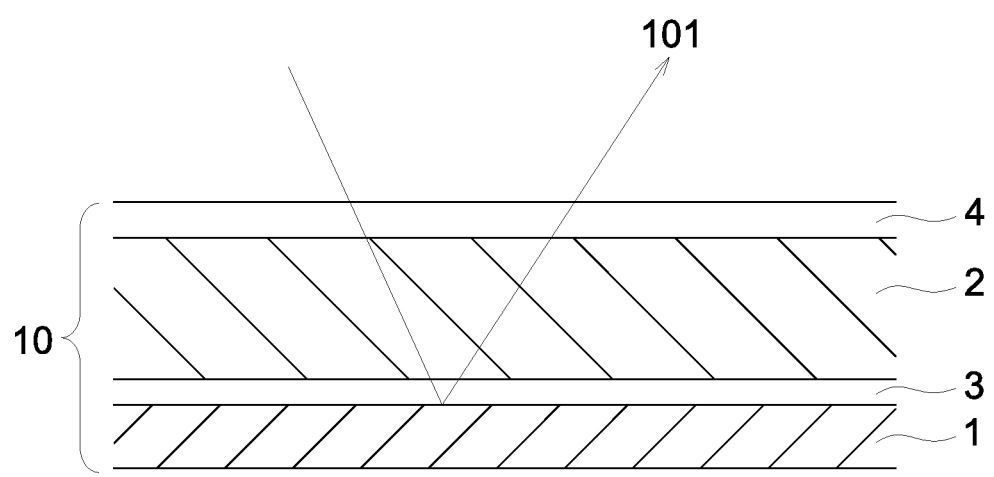

REFLECTIVE MIRROR FOR SOLAR THERMAL POWER GENERATION

This application is a U.S. national phase application under 35 USC 371 of International Application PCT/JP2010/051601 filed Feb. 4, 2010.

TECHNICAL FIELD

The present invention relates to a reflective mirror for collecting light used in a solar thermal power generation system which generates power by heat generated on collecting of sunlight

TECHNICAL BACKGROUND

As one of systems obtaining electric energy, a light-electricity conversion system employing sunlight has been studied.

As the systems employing sunlight, there are mentioned a sunlight power system generation system directly converting sunlight to electricity, and a solar thermal power generation (light collection type solar thermal power generation) system converting the heat of sunlight to electricity.

Of these, the solar thermal power generation has advantages in that it is less in environmental load, enables 24 hours' power generation due to stored heat, and is relatively high in energy conversion efficiency.

The solar thermal power generation is one in which sunlight is collected through a reflector such as a mirror and heat of the collected light is transferred to a thermal medium through which power is generated.

In the power generation, a thermal medium, for example, water, oil, a melted salt or the like is employed and heated and water is evaporated by the heated thermal medium, whereby a stream turbine is revolved to generate power.

The solar thermal power generation system has shortcomings in that a long sunshine duration and a vast tract of land are necessary and big equipments, which function with a stable performance even under severe weather conditions, are required, as compared with the sunlight power generation system.

As one of the big equipments, which function with a stable performance under severe weather conditions, there is a reflective mirror used for collecting sunlight.

As the reflective mirrors, there are generally known a glass mirror in which a reflector is provided on a glass plate and a film mirror in which a reflector is provided on a film other than glass, for example, a plastic film. They are properly employed depending on the usage.

As the film mirror, there is known a film mirror as disclosed in, for example, Japanese Patent O.P.I. Publication No. 2004-77643 which comprises a base film, a silver deposition film and a film for preventing corrosion provided on the base film in that order, and a back coat film provided on the surface of the base film opposite the anchor film.

As the reflective mirror for collecting sunlight, there is known a mirror as disclosed in Japanese Patent O.P.I. Publication No. 2005-106432 in which a synthetic resin such as FRP is plated to obtain a mirror surface or a mirror as disclosed in Japanese Patent O.P.I. Publication No. 2008-249166 in which a heat resistant resin such as a phenol resin, a fluorine-containing resin or a polyimide resin is vapor deposited or plated with aluminum to obtain a mirror surface.

A concave mirror as described later is known as an optical member (concave mirror), which is small in temperature variation of optical property, light in weight, and excellent in mass productivity.

A concave mirror is known which comprises a metal film with a reflective surface provided on the smooth surface of a base material prepared from a nano-composite as a raw material in which a microfibrillated cellulose assembly is impregnated with a plastic resin as a raw material (refer to Patent Document Nos. 1 and 2).

However, when these reflective mirrors are employed as a light collecting reflective mirror used for solar thermal power generation, light collecting performance greatly deteriorates under temperature or humidity variation in a place to be installed. Therefore, a reflective mirror having further stable light collecting ability has been required.

Specifically, when light is collected employing a heliostat, a reflective mirror with high specular reflectance has been desired, and further, a reflective mirror, which exhibits a high stable light collecting ability and particularly high stability of specular resistance under temperature or humidity variation in a place to be installed, has been desired.

PRIOR ART LITERATURES

Patent Documents

Patent Document 1: Japanese Patent O.P.I. Publication No. 2008-165094

Patent Document 2: Japanese Patent O.P.I. Publication No. 2008-233838

DISCLOSURE OF THE INVENTION

Problems to be Solved by the Invention

An object of the invention is to provide a reflective mirror for solar thermal power generation with high durability which can maintain a high and stable light collecting property against long term exposure of sunlight and variation of weather conditions, when sunlight is collected outdoors, and which can be used over a long period of time.

Means for Solving the above Problems

The above object of the invention has been attained by the following constitutions.

1. A reflective mirror for solar thermal power generation comprising a metal film and provided thereon, a substrate, the reflective mirror reflecting sunlight entering from the substrate side, featured in that the substrate is a film composed of a resin containing microfibrillated cellulose.

2. The reflective mirror for solar thermal power generation of item 1 above, featured in that a moisture proof layer is provided between the substrate and the metal film and an anti-stain layer is provided on the side of the substrate opposite the metal film.

Effects of the Invention

The present invention can provide a reflective mirror for solar thermal power generation with high durability which can maintain a high and stable light collecting property against variation of temperature and humidity, when sunlight is collected outdoors, and which can be used over a long period of time.

BRIEF EXPLANATION OF THE DRAWINGS

FIG. 1 is a schematic view showing the reflective mirror for solar thermal power generation of the invention.

PREFERRED EMBODIMENT OF THE INVENTION

The reflective mirror for solar thermal power generation of the invention comprises a metal film and provided thereon, a substrate, the reflective mirror reflecting sunlight entering from a substrate side, featured in that the substrate is a film composed of a resin containing microfibrillated cellulose.

The present invention can provide a reflective mirror for solar thermal power generation with high durability, wherein the reflective mirror employs a specific combination of a metal film and a film composed of a resin containing microfibrillated cellulose.

FIG. 1 is a schematic view showing the reflective mirror for solar thermal power generation of the invention.

The reflective mirror 10 for solar thermal power generation of the invention comprises a metal film 1 and provided thereon, a substrate 2. The sunlight 101 enters the mirror from the side of the substrate 2 opposite the metal film 1 and is reflected by the metal film 1.

The reflective mirror for solar thermal power generation of the invention preferably has a moisture proof layer 3 between the metal film 1 and the substrate 2, and may have an anti-stain layer 4 on the surface of the substrate 2 opposite the metal film.

The reflective mirror may have an anti-corrosive layer on the surface of the substrate opposite the metal film 1.

The reflective mirror for solar thermal power generation of the invention in itself functions as a reflective mirror of a solar thermal power generation, or the reflective mirror for solar thermal power generation of the invention, provided on a mirror support (not illustrated), functions as a reflective mirror of a solar thermal power generation.

Next, the substrate, metal film, moisture proof layer and anti-stain layer will be explained.

(Substrate)

The reflective mirror for solar thermal power generation of the invention has the substrate on the metal film.

The substrate in the invention is a film composed of a resin containing a microfibrillated cellulose (hereinafter also abbreviated as MFC).

In the invention, a film implies a plate with a thickness of not more than 300 μm.

<MFC>

MFC in the invention refers to a cellulose fiber with an average fiber diameter of preferably from 4 to 200 nm. The fiber may be composed of single fibers, which lie therebetween without attracting each other and are sufficiently isolated from each other. In this case, the average fiber diameter of the fiber is an average diameter of the single fiber. The fiber in the invention may have a structure of threads in which a plurality (a large number) of single fibers are bundled. In this case, the average fiber diameter is an average diameter of the thread.

The average fiber diameter of the fiber is preferably from 4 to 100 nm, and more preferably from 6 to 200 nm.

The fiber may include a fiber having a fiber diameter falling outside the range of from 4 to 100 nm therein, as long as it has an average fiber diameter of from 4 to 100 nm. However, the content of the fiber having a fiber diameter falling outside the range of from 4 to 100 nm in the fiber is preferably not more than 30% by mass. It is desired that all the fibers have a fiber diameter of preferably not more than 200 nm, more preferably not more than 100 nm, and still more preferably not more than 60 nm.

The length of the fiber is not specifically limited, however, the average fiber length of the fiber is preferably not less than 100 nm. When the average fiber length is less than 100 nm, the fibers tend to lower reinforcing effect and result in a poor strength of reinforced composite materials. Herein also, the fiber may include a fiber having a fiber having a fiber length of less than 100 nm, however, the content of the fiber having a fiber length of less than 100 nm in the fiber is preferably not more than 30% by mass.

The fiber diameter or fiber length above can be measured according to a microscope or an electron microscope, which is commercially available. For example, MFC is photographed by means of a scanning electron microscope to obtain a photographic image enlarged by a magnification of 2000. The photographic image thus obtained is analyzed by means of "SCANNING IMAGE ANALIZER" produced by Nippon Denshi Co., Ltd., whereby the fiber diameter or fiber length is measured. Herein, the fiber diameters and lengths of one hundred fibers are measured, whereby the average fiber diameter and the average fiber length of the fiber are determined.

The cellulose fiber refers to a microfibril of the cellulose constituting the basic skeleton of plant cell walls or the constitution fiber thereof, and is ordinarily an assembly of single fibers having a fiber diameter of approximately 4 nm. The cellulose fiber having a crystalline structure of not less than 40% is preferred in obtaining high strength and low thermal expansion.

The cellulose fiber used in the invention may be one obtained by being isolated from plants or ones of bacterial cellulose produced by bacteria.

Pulps used as materials for MFC include a pulp prepared according to a mechanical method (groundwood pulp, refiner groundwood pulp, thermomechanical pulp, semichemical pulp, chemiground pulp and the like); and a pulp prepared by a chemical method (kraft pulp, sulphite pulp and the like). As the pulp, a tree pulp, a linter pulp or a waste paper pulp is ordinarily employed. Examples thereof include a purified pulp obtained by delignification such as a bamboo pulp or a bagasse pulp; a cellulose based natural pulp such as cotton fiber, cotton linter or hemp fiber; a purified natural fiber obtained by delignification thereof; a reproduced cellulose product such as viscose, rayon, tencel or polynosic fiber; a plant fiber derived from grain or fruit (for example, wheat bran, oat bran, corn hull, rice bran, draff, soymeal, pea fiber, okara or apple fiber); and lignocellulose materials represented by wood or rice straw.

Further, non-wood materials such as kenaf, cladophola, esparto, camellia, mitsumata, diplomorpha sikokiana, and ramie may be employed, and cellulose produced by microorganisms, valonia cellulose or halocynthia cellulose can be also employed.

Among these, those employing a wood pulp as a main raw material is preferred in which a synthetic pulp such as polypropylene may be added as necessary. Preferably usable is an inorganic substance loaded pulp, and examples of cellulose pulp used in the manufacture thereof include chemical pulp, semichemical pulp, semimechanical pulp, and mechanical pulp such as sulphite pulp (SP), alkaline pulp (AP), and kraft pulp (KP) which are made of broad leaf tree or needle-leaved tree. Pulp can be used whether bleached or not, or whether beaten or not. A broad leaf tree bleached kraft pulp (hereinafter, referred to also as LBKP) or a needle-leaved tree bleached kraft pulp is most preferable in view of quality and cost. As the wood pulp, any of LBKP, LBSP, NBKP, NBSP, LDP, NDP, LUKP and NUKP may be employed, but it is preferable to employ, in a larger amount, LBKP, NBSP, LBSP, NDP or LDP, each having short-fiber components at higher content. However, the content of LBSP and/or LDP is preferably from 10 to 70% by mass.

Freeness of the pulp is preferably from 200 to 500 ml based on the definition of CSF. With respect to the fiber length after beaten, the sum of mass percent of 24 mesh residue and mass percent of 42 mesh residue, specified in JIS P 8207, is preferably from 30 to 70% in manufacturing MFC. Herein, the mass percent of the 4 mesh residue is preferably not more than 20% by mass.

The bamboo pulp also is preferably employed. Although the pulp employed is not specifically limited, Japanese timber bamboo is preferable to moso bamboo in manufacturing MFC, since the former has a smaller fiber diameter (not more than 15 μm).

Further, water soluble gums such as xanthan gum, karaya gum, carrageenan, pectin or sodium carboxycellulose, or hydrophilic materials such as hydrolyzed product of starch and dextrin can be optionally added to the cellulose based materials. These water soluble gums and hydrophilic materials may be added to microcellulose obtained by grinding.

In the invention, a dispersion auxiliary can be added. The content thereof is ordinarily not more than 1 part by mass. Examples of the dispersion auxiliary include water soluble compounds or water swelling compounds such as glucose, sucrose, fructose, lactose, maltose, cellobiose, cellotriose, cellotetraose, maltotriose, fructose, xylose, various kinds of oligosaccharides, sorbit, dextrin, starches, sorbose, gum decomposition products, various gums, pullulan, curdlan, agar, pectin, dextran, gelatin, cellulose derivatives, alginic acid, furcellaran, and marmelo.

These can be employed in a processing method due to phosphate and the like. The method is one in which the surface of plant cell walls is esterified by phosphoric acid to weaken the bonding force between the cellulose fibers, and then subjected to refiner treatment to separate the fibers from each other, whereby cellulose fibers are obtained. For example, plant cell walls in which lignin and the like are removed are immersed in a solution containing 50% by mass of urea and 32% by mass of phosphoric acid, sufficiently impregnated with the solution at 60° C., and further heated to 180° C., whereby the phosphorylation proceeds. The resulting material is washed with water, then subjected to hydrolysis in an 3% by mass hydrochloric acid aqueous solution at 60° C. for two hours, then washed with water, and finally treated in a 3% by mass sodium carbonate aqueous solution at room temperature for 20 minutes to terminate phosphorylation. The resulting product is refined by means of a refiner, thereby obtaining cellulose fibers.

The fiber used in the invention may be one in which the cellulose fiber as obtained above are chemically or physically modified to enhance functionality. Herein, examples of the chemical modification include introduction of a functional group through acetylation, cyanoethylation, acetalization, etherification or isocyanation; and compounding or coating an inorganic compound such as silicate or titanate through chemical reaction or a sol-gel method. As the chemical modification, there is, for example, a method in which cellulose fibers are immersed in anhydrous acetic acid and heated to be acetylated, the acetylation providing minimized water absorption and improved heat resistance without lowering light transmittance. As the physical modification, there is a method in which the cellulose fibers are surface coated with metals or ceramics through physical vapor deposition (PVD) or chemical vapor deposition (CVD) such as vacuum deposition, ion plating or sputtering or a plating method such as electroless plating or electrolytic plating.

With respect to MSC in the invention, one prepared by subjecting a product produced by bacteria to alkali treatment to dissolve and remove bacteria therein can be employed without be isolated.

Living organisms in the earth capable of producing cellulose are distributed in acidian in the animal kingdom, in various algae, oomycota and myxomycete in the protista kingdom, blue-algae in the monera kingdom, in a part of acetic acid bacteria or solid bacteria, as well as in the plant kingdom. Hitherto, those capable of producing cellulose have not still been found in the fungi kingdom (fungi). As the acetic acid bacteria, there is mentioned *acetobactor*. Examples thereof include *acetobactor aceti, acetobactor* subsp., and *acetobactor xylinum*, but are not limited thereto Cellulose is produced from the bacteria by cultivating the bacteria. The resulting product contains the bacteria and cellulose fibers which are produced from the bacteria and attached to the bacteria. The product is taken out from the culture medium, and then subjected to water washing or alkali treatment to remove the bacteria, thereby obtaining hydrous bacteria cellulose. After that, the bacteria cellulose can be obtained by removing water from the hydrous bacteria cellulose.

As a method of removing the bacteria remaining in the bacteria cellulose, there is water washing treatment or alkaline treatment. As the alkaline treatment to dissolve and remove the bacteria, there is mentioned a method in which the bacteria cellulose taken out from the culture medium is treated with an alkaline aqueous solution containing an alkali in an amount of from 0.01 to about 10% by mass for at least one hour. The bacteria cellulose, after subjected to the alkaline treatment, is taken out from the alkaline solution and sufficiently washed with water to remove the alkaline solution.

The thus obtained hydrous bacteria cellulose (ordinarily having a water content of from 95 to 99% by mass) is followed by water removing treatment.

The water removing treatment method is not specifically limited, and examples thereof include a method in which the hydrous bacteria cellulose is allowed to stand or subjected to cold press to remove some water, and then is further allowed to stand or subjected to hot press to completely remove the residual; and a method in which the hydrous bacteria cellulose, after subjected to cold pressing, is dried in a dryer or is subjected to natural drying to remove the residual water.

The cold press is a method in which water is removed by applying pressure without heating, whereby some residual water can be removed. The pressure at this cold press is preferably from 0.01 to 10 MPa, and more preferably from 0.1 to 3 MPa. When the pressure is lower than 0.01 MPa, the residual water amount in the bacteria cellulose tends to be large. When the pressure is higher than 0.01 MPa, the resulting bacteria cellulose may decompose. The temperature at the cold press is not specifically limited, and preferably ordinary temperature for convenience in processing.

The hot press is a method in which water is removed by applying pressure and heat, whereby residual water can be completely removed. The pressure at this hot press is preferably from 0.01 to 10 MPa, and more preferably from 0.2 to 3 MPa. When the pressure is lower than 0.01 MPa, the residual water is not removed in some cases. While when the pressure is higher than 10 MPa, the resulting bacteria cellulose may decompose. The temperature at the hot press is preferably from 100 to 300° C., and more preferably from 110 to 200° C. When the temperature is lower than 100° C., more time to remove the residual water is necessary, while when the temperature is higher than 300° C., the resulting bacteria cellulose may decompose.

Further, the drying temperature in the dryer described above is preferably from 100 to 300° C., and more preferably from 110 to 200° C. Herein also, when the temperature is lower than 100° C., the residual water cannot be removed in some cases, while when the temperature is higher than 300° C., the resulting bacteria cellulose tends to decompose.

It is known that MFC can be obtained by applying strong mechanical shearing force to the cellulose fiber of papermaking pulp and the like, and many manufacturing methods of MFC have been proposed. A method of manufacturing a minute fibrous cellulose is proposed in, for example, Japanese Patent No. 60-19921, which comprises a first step of passing a fibrous cellulose suspension solution through minute orifices to give a high rate at a pressure difference of at least 3000 psi and then rapidly reducing the rate by collision to carry out cutting action, and a second step of repeating the first step so that the fibrous cellulose suspension solution is a substantially stable suspension solution.

A method is disclosed in Japanese Patent O.P.I. Publication No. 4-82907, in which short fibers of dry natural cellulose fibers are pulverized to obtain fibrillated natural cellulose. A method is disclosed in Japanese Patent O.P.I. Publication No. 6-10286, in which a fibrous cellulose suspension is subjected to wet pulverizing treatment by means of a vibration mill grinder employing, as pulverizing media, beads or balls composed of materials such as glass, alumina, zirconia, zircon, steel, and titania to obtain a microfibrillated cellulose.

It is preferred that the cellulose based raw material is pulverized employing a plurality of pulverizing means to obtain MFC. The pulverizing means are not specifically limited, however, in order to pulverize the raw material into particle size meeting the object of the invention, means are preferably employed which provide strong shearing force such as a high pressure homogenizer, a medium mill, a whetstone rotation type grinder and a stone mortar grinder.

The high pressure homogenizer is an apparatus in which crushing is carried out by a shearing force due to accelerated high flow rate, rapid pressure fall (cavitation) or impact produced by particles with high flow rate colliding with each other in minute orifices. As a commercially available high pressure homogenizer, there is Nanomizer (produced by Nanomizer Co., Ltd.) or Microfluidizer (produced by Microfluidics Co., Ltd.).

When fibrillation or homogenization of cellulose is carried out employing the high pressure homogenizer, the extent of the fibrillation or homogenizer depends on feeding pressure, at which cellulose is pressure fed to the high pressure homogenizer, and frequency (pass frequency), at which cellulose passes through the high pressure homogenizer. The feeding pressure is ordinarily from 500 to 2000 kg/cm$^2$ in carrying out pulverizing treatment, but is preferably from 1000 to 2000 kg/cm$^2$ in view of productivity. The pass frequency is for example, from 5 to 50, preferably from 10 to 40, and more preferably from 20 to 30. Examples of the medium mill include a wet vibration mill, a wet planet vibration mill, a wet ball mill, a wet roll mill, a wet Co-ball mill, a wet beads mill, and a wet paint shaker. The beads mill comprises a container containing media made of metal or ceramics in which wet crushing is carried out by vigorously stirring the media. Examples of a commercially available beads mill include Apex Mill (produced by Kotobuki Giken Kogyo Co., Ltd.), Pearl Mill (produced by Ashizawa Co., Ltd.) and DYNO MILL (produced by Shinmaru Enterprises Corporation).

A whetstone rotation type grinder is one kind of a colloid mill or a stone mortar type grinder in which the aqueous dispersion passes through the gap between the two whetstones each composed of whetstone particles having a grain size number of from 16 to 120 whereby grinding is carried out. This passing process may be optionally carried out two or more times. It is preferred that the whetstone is appropriately changed to another whetstone. The whetstone rotation type grinder has both fiber shortening function and microfibryllation function, and the functions are influenced by the grain size of the whetstone particles. When fiber shortening is performed, a whetstone having a grain size number of not more than 46 is effective, while when microfibryllation is performed, a whetstone having a grain size number of not less than 46 is effective. A whetstone having a grain size number of 46 has both fiber shortening function and microfibryllation function. Typical examples of the whetstone rotation type grinder include Pure Fine mill (Grinder mill) (produced by Kurita Kikai Seisakusho); and Cerendipitor, Supermasscolloider and Super grinder (each produced by Masuko Sangyo Co., Ltd.).

In the invention, MFC obtained is added to a resin directly or in the form of a dispersion solution. The content of the MFC is preferably from 0.1 to 50% by mass, more preferably from 5 to 50% by mass, and still more preferably from 10 to 40% by mass.

A method of adding MFC to a resin is not specifically limited. In a solution cast method described later, a method is employed in which the MFC is added to a dispersion solution for preparation of a dope, and in a melt cast method described later, a method is employed in which the MFC is added to pellet which is a composition containing a resin.

The substrate in the invention is a film composed of a resin containing MFC.

Examples of the resin include a cellulose ester resin, a polycarbonate resin, a polyethersulfone resin, a polyethylene terephthalate resin, a polyimide resin, an acryl resin, a polysulfone resin, a polyarylate resin, a polyethylene resin, a polystyrene resin, a polyvinyl chloride resin, and an alicyclic olefin polymer. Among these, thermoplastic resins such as a cellulose ester resin, an acryl resin and a cyclic olefin resin are preferred.

<Cellulose Ester Resin (Hereinafter Also Referred to as Cellulose Ester)>

The cellulose ester used in the invention is preferably a single or mixed acid cellulose ester including in the cellulose ester structure at least one of an aliphatic acyl group or a substituted or unsubstituted aromatic acyl group.

Next, cellulose ester particularly useful in the invention will be exemplified, but is not limited thereto.

Examples of the benzene ring substituent group, when the aromatic ring in the aromatic acyl group is a benzene ring, include a halogen atom, a cyano group, an alkyl group, a cycloalkyl group, an alkoxy group, and aryl group, an aryloxy group, an acyl group, a carbonamide group, a sulfonamide group, a ureido group, an aralkyl group, a nitro group, an alkoxy carbonyl group, an aryloxy carbonyl group, an aralkyoxy carbonyl group, a carbamoyl group, a sulfamoyl group, an acyloxy group, an alkenyl group, an alkinyl group, an alkyl sulfonyl group, an aryl sulfonyl group, an alkyloxy sulfonyl group, an aryloxy sulfonyl group, an alkyl sulfonyloxy group, and an aryloxy sulfonyl group, —S—R, —NH—CO—OR, —PH—R, —P(—R)$_2$, —PH—O—R, —P(—R)(—O—R), —P(—O—R)$_2$, —PH(=O)—R—P(=O)(—R)$_2$, —PH(=O)—O—R, —P(=O)(—R)(—O—R), —P(=O)(—O—R)$_2$, —O—PH(=O)—R, —O—P(=O)(—R)$_2$—O—PH(=O)—O—R, —O—P(=O)(—R)(—O—R), —O—P (=O)(—O—R)₂, —NH—PH(=O)—R, —NH—P(=O)(—R), —NH—P(=O)(—O—R)₂, —SiH₂—R, —SiH(—R)₂, —Si(—R)₃, —O—SiH₂R, —O—SiH(—R)₂ and —O—Si(—R)₃. R above is a fatty acid group, an aromatic group, or a heterocyclic group. The number of substituent groups is preferably between 1 and 5, more preferably between 1 and 4 and still more preferably between 1 and 3, and most preferably either 1 or 2. Examples of the substituent group preferably include a halogen atom, cyano, an alkyl group, an alkoxy group, an aryl group, an aryloxy group, an acyl group, a carbonamide group, a sulfonamide group, and a ureido group, and more preferably, a halogen atom, cyano, an alkyl group, an alkoxy group, an aryloxy group, an acyl group, and a carbonamide group, and still more preferably, a halogen atom, cyano, an alkyl group, an alkoxy group, and an aryloxy group, and most preferably, a halogen atom, an alkyl group, and an alkoxy group.

Examples of the halogen atom include a fluorine atom, a chlorine atom, a bromine atom, and an iodine atom.

The alkyl group may have ring structure or may be branched. The number of carbon atoms in the alkyl group is preferably 1 to 20, more preferably 1 to 12, still more preferably 1 to 6, and most preferably 1 to 4. Examples of the alkyl group include methyl, ethyl, propyl, isopropyl, butyl, t-butyl, hexyl, cyclohexyl, octyl and 2-ethyl hexyl. The alkoxy group may have ring structure or may be branched. The number of carbon atoms in the alkoxy group is preferably 1 to 20, more preferably 1 to 12, still more preferably 1 to 6, and most preferably 1 to 4. The alkoxy group may be further substituted with another alkoxy group. Examples of the alkoxy group include a methoxy, ethoxy, 2-methoxyethoxy, 2-methoxy-2-ethoxyethoxy, butyloxy, hexyloxy and octyloxy.

The number of carbon atoms in the aryl group is preferably 6 to 20, and more preferably 6 to 12. Examples of the aryl group include phenyl and naphtyl. The number of carbon atoms in the aryloxy group is preferably 6 to 20, and more preferably 6 to 12. Examples of the aryloxy group include phenoxy and naphtoxy. The number of carbon atoms in the acyl group is preferably 1 to 20, and more preferably 1 to 12. Examples of the acyl group include hormyl, acetyl, and benzoyl. The number of carbon atoms in the carbonamide group is preferably 1 to 20, and more preferably 1 to 12. Examples of the carbonamide include acetoamide and benzamide. The number of carbon atoms in the sulfonamide group is preferably 1 to 20, and more preferably 1 to 12. Examples of the sulfonamide include methane sulfonamide, benzene sulfonamide, and p-toluene sulfonamide. The number of carbon atoms in the ureido group is preferably 1 to 20, and more preferably 1 to 12. Examples of the ureido group include (unsubstituted) ureido.

The number of carbon atoms in the aralkyl group is preferably 7 to 20, and more preferably 7 to 12. Examples of the aralkyl group include benzyl, phenethyl, and naphtylmethyl. The number of carbon atoms in the alkoxycarbonyl group is preferably 1 to 20, and more preferably 2 to 12. Examples of the alkoxycarbonyl group include methoxy carbonyl. The number of carbon atoms in the aryloxy carbonyl group is preferably 7 to 20, and more preferably 7 to 12. Examples of the aryloxy carbonyl group include phenoxy carbonyl. The number of carbon atoms in the aralkyloxycarbonyl is preferably 8 to 20, and more preferably 8 to 12. Examples of the aralkyoxycarbonyl include benzyloxycarbonyl. The number of carbon atoms in the carbamoyl group is preferably 1 to 20, and more preferably 1 to 12. Examples of the carbamoyl group include (unsubstituted) carbamoyl and N-methyl carbamoyl. The number of carbon atoms in the sulfamoyl group is preferably no greater than 20, and more preferably no greater than 12. Examples of the sulfamoyl group include (unsubstituted) sulfamoyl and N-methyl sulfamoyl. The number of carbon atoms in the acyloxy group is preferably 1 to 20, and more preferably 2 to 12. Examples of the acyloxy group include acetoxy and benzoyloxy.

The number of carbon atoms in the alkenyl group is preferably 2 to 20, and more preferably 2 to 12. Examples of the alkenyl group include vinyl, allyl and isopropenyl. The number of carbon atoms in the alkinyl group is preferably 2 to 20, and more preferably 2 to 12. Examples of the alkinyl group include ethynyl. The number of carbon atoms in the alkyl sulfonyl group is preferably 1 to 20, and more preferably 1 to 12. The number of carbon atoms in the aryl sulfonyl group is preferably 6 to 20, and more preferably 6 to 12. The number of carbon atoms in the alkyloxy sulfonyl group is preferably 1 to 20, and more preferably 1 to 12. The number of carbon atoms in the aryloxy sulfonyl group is preferably 6 to 20, and more preferably 6 to 12. The number of carbon atoms in the alkyl sulfonyloxy group is preferably 1 to 20, and more preferably 1 to 12. The number of carbon atoms in the aryloxy sulfonyl is preferably 6 to 20, and more preferably 6 to 12.

In the cellulose ester of the invention, in the case where the hydrogen atom of the hydroxyl group portion of the cellulose is a fatty acid ester with a fatty acid acyl group, the number of carbon atoms in the fatty acid acyl group is 2-20, and specific examples thereof include acetyl, propionyl, butyryl, isobutyryl, valeryl, pivaroyl, hexanoyl, octanoyl, lauroyl, stearoyl and the like.

The aliphatic acyl group in the invention also refers to one which is further substituted, and examples of the substituent include those which when the aromatic ring in the aromatic acyl group described above is a benzene ring, are denoted in the substituents of the benzene ring.

When the ester group of cellulose ester has an aromatic ring, the number of the substituent groups X on the aromatic ring should be 0 or 1 to 5, preferably 1 to 3, and more preferably 1 or 2. In addition, when the number of substituent groups on the aromatic ring is 2 or more, the substituent groups may be the same or different from each other, and they may also bond with each other to form a condensed polycylic ring (such as naphthalene, indene, indane, phenanthrene, quinoline, isoquinoline, chromene, chromane, phthalazine, acridine, indole, indoline and the like).

The cellulose ester used in the invention has in the ester group a structure selected from at least one of a substituted or unsubstituted aliphatic acyl group or a substituted or unsubstituted aromatic acyl group, and this may be a single acid cellulose ester or a mixed acid cellulose ester, and two or more types of cellulose esters may be used in combination.

The cellulose ester used in the invention is preferably at least one type selected from cellulose acetate, cellulose propionate, cellulose butyrate, cellulose acetate propionate, cellulose acetate butyrate, cellulose acetate phthalate and cellulose phthalate.

Among these, especially preferred cellulose ester is cellulose propionate, cellulose butyrate, cellulose acetate propionate or cellulose acetate butyrate.

The lower aliphatic acid esters such as cellulose acetate propionate and cellulose acetate butyrate, which are more preferred as the mixed aliphatic acid cellulose ester, have an acyl group having 2 to 4 carbon atoms as the substituent.

In the invention, preferred cellulose ester resin comprises cellulose ester satisfying relationships (I) and (I) below, $$2.6 \leq X+Y \leq 3.0 \qquad \text{Relationship (I)}$$

$$1.0 \leq X \leq 2.5 \qquad \text{Relationship (II)}$$

wherein X represents a degree of substitution of the acetyl group; and Y represents a degree of substitution of the propionyl group or the butyryl group.

Among these, cellulose acetate propionate is especially preferably used herein, and among the cellulose acetate propionates, those that satisfy 1.9≤X≤2.5 and 0.1≤Y≤0.9 are particularly preferred. A hydroxyl group is usually present at the portions which are not substituted with an acyl group. These may be synthesized by a known method.

In the cellulose ester used in the invention, the ratio of the weight average molecular weight Mw/number average molecular weight Mn is preferably from 1.5 to 5.5, more preferably from 2.0 to 5.0, still more preferably from 2.5 to 5.0, and most preferably from 3.0 to 5.0.

Cellulose which is a raw material for the cellulose ester may be wood pulp or cotton linter, and the wood pulp may be that of a needle-leaf tree or a broad-leaf tree, but that of the broad-leaf tree is more preferable. Cotton linter is preferably used in view of peeling properties at the time of film formation. Cellulose esters made from these substances may be used singly or in combination.

For example, the proportion used of cellulose ester from cotton linter: cellulose ester from wood pulp (needle-leaf tree): cellulose ester from wood pulp (broad-leaf tree) may be 100:0:0, 90:10:0, 85:15:0, 50:50:0, 20:80:0, 10:90:0, 0:100:0, 0:0:100, 80:10:10, 85:0:15, and 40:30:30.

Cellulose ester is preferred which exhibits a pH of from 6 to 7 and an electroconductivity of from 1 to 100 μS/cm, when 1 g of the cellulose ester is introduced in 20 ml of pure water (with a pH of from 6.8 and an electroconductivity of not more than 0.1 μS/cm and stirred under a nitrogen atmosphere.

<Acryl Resin>

An acryl resin usable in the invention includes a methacryl resin. The methacryl resin is preferably one comprising 50 to 99% by mass of a methyl methacrylate unit and 1 to 50% by mass of another copolymerizable monomer unit.

Examples of another copolymerizable monomer include an alkyl methacrylate in which the alkyl has a carbon atom number of 2 to 18; an alkyl acrylate in which the alkyl group has a carbon atom number of 1 to 18 carbon atoms; an α,β-unsaturated acid such as acrylic acid or methacrylic acid; an unsaturated group-containing bicarboxylic acid such as maleic acid, fumaric acid or itaconic acid; an aromatic vinyl compound such as styrene, α-methylstyrene or a nucleus-substituted styrene; an α,β-unsaturated nitrile such as acrylonitrile or methacrylonitrile; maleic acid anhydride; maleimide; an N-substituted maleimide; and glutaric acid anhydride. These may be used singly or in combination.

Of these, methyl acrylate, ethyl acrylate, n-propyl acrylate, n-butyl acrylate, s-butyl acrylate or 2-ethylhexyl acrylate is preferred; and methyl acrylate or n-butyl acrylate is especially preferred.

The acryl resin has a weight average molecular weight (Mw) of preferably 80000 to 1000000 in view of mechanical strength as a film and fluidity during film manufacture. This weight average molecular weight can secure compatibility of heat resistance and brittleness of the film.

The weight average molecular weight of the acryl resin can be measured according to gel permeation chromatography. The measurement conditions are as follows:
Solvent: Methylene chloride
Column: Three columns of Shodex K806 K805, K803G (made by Showa Denko Co., Ltd.) were connected.
Column temperature: 25° C.
Sample concentration: 0.1% by mass
Detector: RI Model 504 (made by GL Science Co.)
Pump: L6000 (made by Hitachi Seisakusho Co., Ltd.)
Flow rate: 1.0 ml/min
Calibration curve: A calibration curve was employed which was prepared from 13 samples of standard polystyrenes (standard polystyrene STK made by TOSO Co., Ltd.) having an Mw of from 500 to 2,800. It is preferred that the 13 samples had substantially the same molecular weight interval.

A production method of the acryl resin is not specifically limited, and known methods known such as a suspension polymerization, an emulsion polymerization, a block polymerization and a solution polymerization can be employed. As a polymerization initiator, a conventional peroxide or azo type initiator or a redox type initiator can be employed. With respect to polymerization temperature, the suspension or emulsion polymerization is carried out at a temperature of from 30 to 100° C., and the block or solution polymerization is carried out at a temperature of from 80 to 160° C. In order to control the reduction viscosity of a copolymer produced, polymerization can be conducted using a chain transfer agent such as an alkylmercaptan.

The acryl resin in the invention may be a commercially available one. Examples thereof include Delpet 60N, 80N (made by Asahi Chemical Industry Co., Ltd.), Dianal BR52, BR80, BR83, BR85, BR88 (made by Mitsubishi Rayon Co., Ltd.) and KT75 (made by Denki Kagaku Kogyo Co., Ltd.).

<Cyclic Olefin Resin>

In the invention, it is also preferred that a cyclic olefin resin is employed. Examples of the cyclic olefin resin include a norbornene-based resin, a monocyclic cyclic olefin-based resin, a cyclic conjugated diene-based resin, a vinyl alicyclic hydrocarbon based resin and their hydrogenates. Among these, the norbornene-based polymer is suitably employed in view of transparency and moldability.

As the norbornene based resin, there are, for example, a ring-opening polymer of a monomer with a norbornene structure, a ring-opening copolymer of a monomer with a norbornene structure with another monomer or a hydrogenate thereof, and an addition polymer of a monomer with a norbornene structure, an addition copolymer of a monomer with a norbornene structure with another monomer or a hydrogenate thereof.

Among these, a hydrogenate of a ring-opening polymer of a monomer with a norbornene structure is preferably employed in view of transparency, moldability, heat resistance, low moisture, dimensional stability, light weight.

As the monomer with a norbornene structure, there are bicyclo[2.2.1]hepto-2-ene (common name: norbornene), tricyclo[4.3.0.1$^{2.5}$]deca-3,7-diene (common name: dicyclopentadiene), 7,8-benzotricyclo[4.3.0.1$^{2.5}$]deca-3-ene (common name: methanotetrahydrofluorene), tetracyclo[4.4.0.1$^{2.5}$1$^{7.10}$]dodeca-3-ene (common name: tetracyclododecene), and their derivatives (for example, those having a substituent on the ring thereof). Herein, examples of the substituent include an alkyl group, an alkylene group, and a polar group. The ring may have a plurality of substituents which may be the same or different. The monomers with a norbornene structure may be used singly or as an admixture of two or more kinds thereof.

As the polar group, there is mentioned a hetero atom or an atomic group including a hetero atom. Typical examples of the hetero group include an oxygen atom, a nitrogen atom, a sulfur atom, a silicon atom, and a halogen atom. Typical examples of the polar group include a carboxyl group, a carbonyloxycarbonyl group, an epoxy group, a hydroxyl group, an oxy group, an ester group, a silanol group, a silyl group, an amino group, a nitro group and a sulfone group.

Examples of another monomer capable of ring-opening copolymerizing with the monomer with a norbornene structure include a monocyclic olefin such as cyclohexene, cycloheptene, or cyclooctene and derivatives thereof; and a cyclic conjugated diene such as cyclohexadiene or cycloheptadiene and derivatives thereof.

The ring-opening polymer of the monomer with a norbornene structure and the ring-opening copolymer of the monomer with a norbornene structure with another monomer which is capable of able ring-opening copolymerizing therewith may be prepared by (co)polymerizing the monomer in the presence of a ring-opening polymerization catalyst.

Examples of another monomer capable of addition-copolymerizing with the monomer with a norbornene structure include an α-olefin having a carbon atom number of from 2 to 20 such as ethylene, propylene, 1-butene or their derivatives; a cyclic conjugated diene such as cyclobutene, cyclopentene, cyclohexene, cyclooctene or their derivatives; and a non-conjugated diene such as 1,4-hexadiene, 4-methyl-1,4-hexadiene, 5-methyl-1,4-hexadiene or their derivatives. These monomers may be used singly or as an admixture of two or more kinds thereof. Among them, α-olefin is preferred, and ethylene is more preferred.

The addition polymer of the monomer with a norbornene structure and the addition copolymer of the monomer with a norbornene structure with another monomer which is capable of able copolymerizing therewith may be prepared by polymerizing the monomer in the presence of an addition polymerization catalyst.

The hydrides of the ring-opening polymer of a monomer with a norbornene structure, the ring-opening copolymer of a monomer with a norbornene structure with another monomer capable of ring-opening copolymerizing therewith, the addition polymer of a monomer with a norbornene structure, and the addition copolymer of a monomer with a norbornene structure with another monomer capable of copolymerizing therewith can be prepared by a method in which a solution of the ring-opening polymer or copolymer or the addition polymer or copolymer is subjected to hydrogenation in the presence of a known hydrogenation catalyst containing a transition metal such as nickel or palladium and hydrogenated, wherein 90% or more of the carbon-carbon unsaturated bond in the polymer or copolymer are preferably hydrogenated.

Among the norbornene based resins, a resin is preferred which comprises a repeating unit X, a bicyclo[3.3.0]octane-2,4-diyl-ethylene structure and a repeating unit Y, a tricyclo[4.3.0.1$^{2.5}$]decane-7,9-diyl-ethylene structure, the content of these repeating units being 90% by mass or more based on the total repeating units in the resin, and has a content ratio by mass of X to Y being 100:0 to 40:60. Such a resin can provide a phase difference film (optical film) with excellent optical property in which no dimension variation occurs for a long period of time.

The molecular weight of the cyclic olefin resin is suitably selected in accordance with the object of use. The weight average molecular weight (Mw) of the cyclic olefin resin is ordinarily from 20,000 to 150,000, preferably from 25,000 to 100,000 and more preferably from 30,000 to 80,000, in terms of polyisoprene or polystyrene, measured by gel permeation chromatography, in which cyclohexane is employed as a solvent (when the resin is not soluble in cyclohexane, toluene is employed as a solvent). When the weight average molecular weight falls within the above range, the mechanical strength and moldability of a film are well balanced.

The glass transition temperature of the cyclic olefin resin may be suitably selected in accordance with the object of use, and is preferably from 130 to 160° C., and more preferably from 135 to 150° C. When the glass transition temperature is lower than 130° C., the heat resistance deteriorates under high temperature, while when the glass transition temperature is higher than 160° C., the heat resistance is improved but ordinary moldability deteriorates.

Further, the molecular weight distribution (weight average molecular weight Mw/number average molecular weight Mn) of the cyclic olefin resin is from 1.5 to 3.5, preferably from 1.5 to 3.0, and more preferably from 1.8 to 2.7. When this value exceeds 3.5, a low molecular weight component increases and a component with a short relaxation time increases, and therefore, it is supposed that a film, which appears to have the same retardation in plane, greatly increases the relaxation time in a short time when exposed to high temperature. On the other hand, the resin with a molecular weight distribution of less than 1.2 results in lowering of productivity and cost increase, which is not practicable for a material of a display.

The absolute value of a photoelastic coefficient of the cyclic olefin resin is preferably not more than $10 \times 10^{-12} Pa^{-1}$, more preferably not more than $7 \times 10^{-12} Pa^{-1}$, and still more preferably not more than $4 \times 10^{-12} Pa^{-1}$. The photoelastic coefficient C is represented by the following formula, $$C = \Delta n / \sigma$$

wherein /σ represents a stress; and Δn represents birefringence.

Polymers or oligomers other than those resins described above may be suitably selected and added to the substrate. The polymers or oligomers to be added are preferably those which have excellent compatibility with the cellulose ester resins or the like. The transparency of the resulting film is preferably at least 80%, more preferably at least 90%, and still more preferably at least 92%.

(Anti-oxidant)

It is preferred that the substrate contains an anti-oxidant.

Preferred anti-oxidant is a phosphorus based anti-oxidant or a phenol based anti-oxidant, and is preferably a mixture thereof.

Next, an ant-oxidant preferably employed in the invention will be explained.

<Phenol Based Anti-oxidant>

In the invention, as an anti-oxidant, a phenol based anti-oxidant is preferably employed, and a hindered phenol compound is especially preferably employed.

Typical examples of the hindered phenol compound include n-octadecyl 3-(3,5-di-t-butyl-4-hydroxyphenyl)-propionate, n-octadecyl 3-(3,5-di-t-butyl-4-hydroxyphenyl)-acetate, n-octadecyl 3,5-di-t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenyl)propionate, dodecyl β-(3,5-di-t-butyl-4-hydroxyphenyl)propionate, ethyl α-(4-hydroxy-3,5-di-t-butyl phenyl)iso butyrate, octadecyl α-(4-hydroxy-3,5-di-t-butyl phenyl)iso butyrate, octadecyl α-(4-hydroxy-3,5-di-t-butyl-4-hydroxy-phenyl)propionate, 2-(n-octylthio)ethyl 3,5-di-t-butyl-4-hydroxy-benzoate, 2-(n-octylthio)ethyl 3,5-di-t-butyl-4-hydroxyphenylacetate, 2-(n-octadecylthio)ethyl 3,5-di-t-butyl-4-hydroxyphenyl acetate, 2-(n-octadecylthio) ethyl 3,5-di-t-butyl-4-hydroxybenzoate, 2-(2-hydroxyethylthio)ethyl 3,5-di-t-butyl-4-hydroxybenzoate, diethyl glycol bis-(3,5-di-t-butyl-4-hydroxy-phenyl)propionate, 2-(n-octadecylthio)ethyl 3-(3,5-di-t-butyl-4-hydroxyphenyl) propionate, stearylamido N,N-bis[ethylene 3-(3,5-di-t-butyl-4-hydroxyphenyl)propionate], n-butylimino N,N-bis[ethylene 3-(3,5-di-t-butyl-4-hydroxyphenyl)propionate], 2-(2-stearoyloxyethylthio)ethyl 3,5-di-t-butyl-4-hydroxybenzoate, 2-(2-stearoyloxyethylthio)ethyl 7-(3-methyl-5-t-butyl-4-hydroxyphenyl)heptanoate, 1,2-poropylene glycol bis-[3-(3,5-di-t-butyl-4-hydroxyphenyl)propionate], ethylene glycol bis-[3-(3,5-di-t-butyl-4-hydroxyphenyl)propionate], neopentyl glycol bis-[3-(3,5-di-t-butyl-4-hydroxyphenyl)propionate], ethylene glycol bis-(3,5-di-t-butyl-4-hydroxyphenyl)acetate, glycerol-1-n-octadecanoate-2,3-bis-(3,5-di-t-butyl-4-hydroxy-phenyl acetate), pentaerythrytol tetrakis[3-(3',5'-di-t-butyl-4'-hydroxyphenyl)propionate], 3,9-bis{2-[3-(3-t-butyl-4-hydroxy-5-methylphenyl)propionyloxy]-1,1-dimethylethyl}-2,4,8,10-tetraoxaspiro[5.5]undecane, 1,1,1-trimethylolethane tris[3-(3,5-di-t-butyl-4-hydroxyphenyl)propionate], sorbitol hexa[3-(3,5-di-t-butyl-4-hydroxyphenyl)propionate], 2-hydroxyethyl 7-(3-methyl-5-t-butyl-4-hydroxyphenyl)propionate, 2-stearoyloxyethyl 7-(3-methyl-5-t-butyl-4-hydroxyphenyl)heptanoate, 1,6-n-hexanediol bis[(3',5'-di-t-butyl-4-hydroxyphenyl)propionate], and pentaerythritol tetrakis(3,5-di-t-butyl-4-hydroxycinnamate). The hindered phenol compounds are available on the market, and there are, for example, IRGANOX 1076 and IRGANOX 1010 (trade name) from Ciba Specialty Chemicals Co., Ltd.

<Phosphorus Based Anti-oxidant>

As the phosphorus based anti-oxidant, a phosphorus based compound such as a phosphite, a phosphonite, phosphinite or a tertiary phosphane can be employed. As the phosphorus based compound, a well-known one can be also employed. Preferred are those disclosed, for example, in Japanese Patent O.P.I. Publication No. 2002-138188, in paragraphs 0022 through 0027 of Japanese Patent O.P.I. Publication No. 2005-344044, in paragraphs 0023 through 0039 of Japanese Patent O.P.J. Publication No 2004-182979, in Japanese Patent O.P.I. Publication Nos. 10-306175, 1-254744, 2-270892, 5-202078, 5-178870, 2004-504435, and 2004-53079, and in Japanese Patent Application No. 2005-353229.

The addition amount of the phosphorus based compound is ordinarily from 0.01 to 10 parts by mass, preferably from 0.05 to 5 parts by mass, and more preferably from 0.1 to 3 parts by mass, based on 100 parts by mass of resin.

In addition to a compound represented by the above formula, as the phosphorus based compound, there are mentioned mono-phosphite compounds such as triphenyl phosphite, diphenylisodecyl phosphite, phenyldiisodecyl phosphite, tris(nonylphenyl)phosphite, tris(dinonylphenyl) phosphite, tris(2,4-di-t-butylphenyl)phosphite, 10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2]dioxaphosphepine and tridecyl phosphite; diphosphite compounds such as 4,4'-butylidene-bis(3-methyl-6-t-butylphenyl-di-tridecyl phosphite) and 4,4'-isopropylidene-bis(phenyl-di-alkyl(C12-C15)phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl)[1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl)phosphine.

The phosphorus based compounds listed above have been commercialized, for example, as "Sumilizer GP" from Sumitomo Chemical Co., Ltd., "ADK STAB PEP-24G" "ADK STAB PEP-36" "ADK STAB 3010" from ADEKA Corp., "IRGAFOS P-EPQ" from Ciba Specialty Chemicals, Inc., and "GSY-P101" from SAKAI CHEMICAL INDUSTRY CO., LTD.

sulfur based anti-oxidants such as dilauryl-3,3'-thiodipropionate, dimyristyl-3,3'-thiodipropionate, distearyl-3,3'thiodipropionate, and pentaerythrityltetrakis(3-lauryl thiopropionate); heat-resistant processing stabilizers such as 2-tert-butyl-6-(3-tert-butyl-2-hydroxy-5-methylbenzyl)-4-methylphenyl acrylate, and 2-[1-(2-hydroxy-3,5-di-tert-pentylphenyl)ethyl]-4,6-di-tert-pentylphenyl acrylate; oxygen scavengers such as a 3,4-dihydro-2H-1-benzopyran based compound 3,3'-spirodichroman based compound, a 1,1-spiroindan based compound and compounds having a partial structure of a skeleton of morpholine, thiomorpholine, thiomorpholineoxide, thiomorpholinedioxide or piperazine described in Japanese Patent Publication No. 8-27508, and a dialkoxybenzen based compound described in Japanese Patent O.P.I. Publication No. 3-174150. The partial structure of these anti-oxidants may be attached to a part of polymer or regularly to polymer, and may be also introduced into a part of a molecular structure of additives such as a plasticizer, an oxygen scavenger and an ultraviolet absorber.

(Other Additives)

In addition to the compounds described above, various compounds can be optionally incorporated in the substrate in the invention.

<Acid Trapping Agent>

As the acid trapping agent, compounds containing an epoxy group described in U.S. Pat. No. 4,137,201 are preferred. Such an epoxy compound is known as an acid trapping agent in the art, and examples thereof include polyglycols derived by condensation such as diglycidyl ethers of various polyglycols, especially those having approximately 8 to 40 moles of ethylene oxide per mole of polyglycol, diglycidyl ethers of glycerol; metal epoxy compounds (such as those conventionally used in vinyl chloride polymer compositions or together with vinyl chloride polymer compositions), epoxy ether condensation products, a diglycidyl ether of Bisphenol A (namely 4,4'-dihydroxydiphenyl dimethyl methane), epoxidated unsaturated fatty acid esters (particularly fatty acid (with a carbon atom number of 2 to 22) alkyl (with a carbon atom number of 4 to 2) esters (such as butyl epoxy stearate); and various epoxy long-chain fatty acid triglycerides; (such as epoxy plant oils which are typically compositions of epoxy soy bean oil; and other unsaturated natural oils (these are sometimes called epoxidized natural glycerides or unsaturated fatty acids and these fatty acids generally have 12 to 22 carbon atoms).

<Light Stabilizer>

As the light stabilizer, there is mentioned a hindered amine light stabilizer (HALS), which is a known compound. Examples thereof include 2,2,6,6-tetraalkyl piperidine compound, a salt thereof with an acid and a complex thereof with a metal compound as described in the 5th through 11th columns in the Specification of U.S. Pat. No. 4,619,956 and in the 3rd through 5th columns in the Specification of U.S. Pat. No. 4,839,405. Further, the light stabilizers described in Japanese Patent O.P.I. Publication No. 2007-63311 can be employed.

<Ultraviolet Absorbent>

An ultraviolet absorbent having excellent absorbance of ultraviolet light with wavelengths not longer than 370 nm is preferred in view of preventing deterioration due to ultraviolet light, and an ultraviolet absorbent having little absorbance of visible light with wavelengths of not shorter than 400 nm from is preferred in view of displaying properties of a liquid crystal display. As the ultraviolet absorbents, there are mentioned, for example, oxybenzophenone compounds, benzotriazole compounds, salicylic acid ester compounds, benzophenone compounds, cyano acrylate compounds, and nickel complex compounds. Benzophenone compounds or little colored benzotriazole compounds are preferred. The ultraviolet absorbents disclosed in Japanese Patent O.P.I. Publication Nos. 10-182621 and 08-337574 and the high molecular ultraviolet absorbents disclosed in Japanese Patent O.P.I. Publication No. 06-148430 may also be used.

Examples of the benzotriazole ultraviolet absorbents include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3'',4'',5'',6''-tetrahydrophthalimidomethyl)-5'-methylphenyl)-benzotriazole, 2,2-methylene bis(4-(1,1,3,3,-tetramethylbutyl)-6-(2H-benzotriazole-2-yl)-phenol), 2-(2'-hydroxy-3'-tert-butyl-5'-methylphenyl)-5-chlorobenzotriazole, 2-(2'-hydroxy-3'-tert-butyl-5'-(2-octyloxycarbonylethyl)-phenyl)-5-chlorobenzotriazole, 2-(2'-hydroxy-3'-(1-methyl-1-phenylethyl)-5'-(1,1,3,3-tetramethylbutyl)-phenyl)benzotriazole, 2-(2H-benzotriazole-2-yl)-6-(straight-chained or branched dodecyl)-4-methylphenol, a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate, and so on, but are not limited thereto.

As commercially available ultraviolet absorbents, there are mentioned TINUVIN 326, TINUVIN 109, TINUVIN 171, TINUVIN 900, TINUVIN 928 and TINUVIN 360 (each being manufactured by Chiba Specialty Chemical Co., Ltd.), LA-31 (manufactured by ADEKA Co., Ltd.), Sumisorb (manufactured by Sumitomo Chemical Co., Ltd.), and RUVA-100 (manufactured by Otsuka Chemical Co., Ltd.).

Examples of the benzophenone compounds include 2,4-dihydroxybenzophenone, 2,2'-dihydroxy-4-methoxy benzophenone, 2-hydroxy-4-methoxy-5-sulfobenzophenone, and bis(2-methoxy-4-hydroxy-5-benzoylphenyl methane), but are not limited thereto.

In the invention, the ultraviolet absorbent is added in an amount of preferably from 0.1 to 20% by mass, more preferably from 0.5 to 10% by mass, and still more preferably from 1 to 5% by mass. Two or more kinds of the ultraviolet absorbents may be used in combination.

<<Matting Agent>>

A matting agent can be added to the film of the invention in order to impart lubricity, and optical and mechanical functions. As the matting agents, there are mentioned fine particles of an inorganic or organic compound.

<Matting Agent>

Fine particles such as matting agents can be added to the substrate in the invention. As the matting agents, there are mentioned fine particles of an inorganic or organic compound. The less the fine particles are, the better. The fine particles include inorganic fine particles of metal oxides, phosphates, silicates or carbonates such as silicon dioxide, titanium dioxide, aluminum oxide, zirconium oxide, calcium carbonate, kaolin, talc, burned calcium silicate, hydrated calcium silicate, aluminum silicate, magnesium silicate and calcium phosphate; and fine particles of cross-linked polymers. Of these, silicon dioxide is preferred in view of reducing haze of a film. The particles such as silicon dioxide particles are often surface treated with an organic substance, and the surface treated ones are preferred in reducing the haze of the resin substrate.

As the organic substances used in the surface treatment, there are mentioned halosilanes, alkoxysilanes, silazanes or siloxanes. Particles having a larger average particle diameter have high lubricity effect, while particles having a smaller average particle diameter have excellent transparency.

The secondary particles of the fine particles have an average particle diameter of 0.05 to 1.0 μm. The secondary particles have an average particle diameter of preferably from 5 to 50 nm, and more preferably from 7 to 14 nm. These fine particles are preferably used because they produce concavo-convexes of from 0.01 to 1.0 μm in the plane of cellulose ester film. The content of the fine particles in the cellulose ester is preferably from 0.005 to 0.3% by mass, based on the cellulose ester.

Examples of the silicon dioxide particles include Aerosil 200, 200V, 300, R972, R972V, R974, R202, R812, OX50, and TT600, each manufactured by Nippon Aerosil Co., Ltd. Of these, Aerosil 200V, R972, R972V, R974, R202, and R812 are preferred. Two or more of these matting agents may be used in combination. In the case where 2 or more matting agents are used, they may be mixed in any proportion. Particles, which are different in an average particle diameter or material, for example, Aerosil 200V and Aerosil R972 are used in an amount ratio by weight of from 0.1:99.9 to 99.9:0.1.

The matting agent is employed in the substrate to enhance strength of the substrate as another object.

(Manufacturing Method of Substrate)

As a manufacturing method of the substrate, a conventional method such as an inflation method, a T-die method, a calendaring method, a cutting method, a cast method, an emulsion method, or a hot melt method can be utilized. A cast method such as a solution cast method or a melt cast method is preferably utilized.

Next, a typical manufacturing method of the substrate, which is a film, will be explained.

<Manufacturing Method of Substrate According to Solution Cast Method>

(Organic Solvents)

When the substrate in the invention is manufactured via a solution cast method, any solvents may be employed as organic solvents useful to form a dope without limitation as long as they dissolve a thermoplastic resin.

Examples thereof include methylene chloride as a chlorine based organic solvent; and methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,-hexafluoro-2-methyl-2-propanol, 1,1,1,3,3,3-hexafluoro-2-propanol, 2,2,3,3,3-pentafluoro-1-propanol, nitroethane, ethyl lactate, lactic acid and diacetone alcohol as non-chlorine based organic solvents. Methylene chloride, methyl acetate, ethyl acetate, and acetone, and ethyl lactate are preferably employed.

In addition to the above organic solvents, straight chain or branched aliphatic alcohols having a straight or branched chain having 1 to 4 carbon atoms may be incorporated in the dope in an amount of 1 to 40% by mass. As the alcohol ratio in the dope increases, the resulting web is gelled, whereby peeling from a metal support become easier. While, as the ratio of alcohol is low, it enhances dissolution of a thermoplastic resin in the non-chlorine based organic solvents.

Specifically, a dope is preferred in which a thermoplastic resin is dissolved in a solvent containing methylene chloride and a straight chain or branched aliphatic alcohol having a carbon atom number of from 1 to 4 in a total amount of from 15 to 45% by mass.

Examples of the straight chain or branched aliphatic alcohol having a carbon atom number of from 1 to 4 include methanol, ethanol, n-propanol, iso-propanol, n-butanol, sec-butanol, and tert-butanol. Of these, ethanol is preferred in view of providing a stable dope and good drying property due to a relatively low boiling point.

Next, a preferred manufacturing method of the substrate in the present invention will be explained.

1) Dissolution Step

A dissolution step is one in which a thermoplastic resin, a thermally contracting material and another additive are dissolved in an organic solvent composed mainly of a good solvent for a plastic resin in a dissolution kettle, while stirring, thereby preparing a dope.

It is possible to dissolve a thermoplastic resin via various dissolution methods such as a method in which the dissolution is carried out at normal pressure, a method in which the dissolution is carried out at a temperature of not higher than the boiling point of the major solvent, a method in which the dissolution is carried out at a temperature of not lower than the boiling point of the major solvent and at increased pressure, a method employing the cooling dissolution methods disclosed in Japanese Patent O.P.I. Publication Nos. 9-95544, 9-95557 and 9-95538, and a method disclosed in Japanese Patent O.P.I. Publication No. 11-21379, in which the dissolution is carried out under high pressure. Of these, preferred is the method in which the dissolution is carried out at a temperature of not lower than the boiling point of the major solvent and at increased pressure.

"Return scrap" refers to those which are produced by finely pulverizing films including both edge portions of the film trimmed during production of the film or to film mill rolls with abrasion defects or the like which falls outside the specifications, but can be recycled.

2) Casting Step

A casting step is one in which a dope is transferred to a pressure die via a solution sending pump (for example, a pressure type quantitative gear pump) and cast from a pressure die slit onto a casting position of a continuously moving endless metal belt such as a stainless steel belt or a metal support such as a rotating metal drum.

A pressure die is preferred in which the slit shape of the metal portion of the die can be adjusted so that a uniform film thickness can be obtained. As the pressure dies, there are a coat hanger die and a T die, both of which are preferably employed. The surface of the metal support is finished to be a mirror surface. In order to increase the film production rate, two or more pressure dies are disposed over the metal support and the dope is divided into several portions to form a multilayer. Alternately, it is preferred to prepare a film of a multi-layered structure via a co-casting method in which a plurality of divided dopes are simultaneously cast.

3) Solvent Evaporation Step

A solvent evaporation step is one in which a web (a dope film, which is formed on a cast support from a dope cast onto the cast support, is called a web) is heated on the cast support, thereby evaporating the solvent.

Solvents are evaporated via a method in which air is blown to the web side and/or a method in which heat is transmitted from the rear side of the support, employing liquid, and a method in which heat is transmitted from both the front and rear surfaces of the support employing a radiant heat. Of these, the rear surface liquid heat transmission method is preferred, providing high drying efficiency. Further, preferably employed are combinations of these methods. It is preferred that the web formed on the support after casting is dried on the support at an ambience of 40 to 100° C. In order to maintain the ambience of 40 to 100° C., it is preferred that air at the above temperature is blown onto the upper surface of the web, or heating is carried out employing a heating means such as infrared ray irradiation.

In view of surface quality, moisture permeability and peeling property, it is preferred that the web is peeled from the support within 30 to 120 seconds.

4) Peeling Step

A peeling process is one in which a web, from which the solvents have been evaporated on the metal support, is peeled in a predetermined peeling position. The peeled web is transferred to the following step.

Temperature at the peeling position on the metal support is preferably from 10 to 40° C., and more preferably from 11 to 30° C.

It is preferred that the web is peeled from the metal support at the time when its residual solvent amount is in the range of from 50 to 120% by mass, considering drying conditions and the length of the metal support. When a web having a larger amount of the residual solvent is peeled, the web is excessively soft, and tends to deteriorate the flatness and to cause wrinkles and longitudinal streaks due to peeling tension. Consequently, the residual solvent amount at the time of the peeling is determined considering compatibility between economical rate and quality.

The residual solvent amount in a web is defined by the following formula.

Residual solvent amount (%)=(weight of a web prior to a heat treatment−weight of the web after the heat treatment)/(weight of the web after the heat treatment)×100

Heat treatment during determination of the residual solvent amount refers to one carried out at 115° C. for one hour.

Peeling tension during peeling of film from the metal support is commonly 196 to 245 N/m. However, when wrinkles tend to be produced, it is preferred that peeling is carried out under a tension of at most 190 N/m. Further, during peeling, the lowest peeling tension is preferably at most 166.6 N, more preferably at most 137.2 N/m, and most preferably at most 100 N/m.

In the present invention, the temperature at the peeling position on the metal support is preferably from −50 to 40° C., more preferably from 10 to 40° C., and most preferably from 15 to 30° C.

5) Drying and Stretching Steps

After peeling, the web is dried in a drying apparatus in which the web is alternately passed through a plurality of rollers installed therein and/or in a tenter stretching apparatus in which the web is conveyed while clipping both edges thereof.

The drying method is generally one in which heated air is blown onto both surfaces of the web. A method is also employed in which heating is carried out via application of microwaves instead of heated air. Too rapid drying tends to deteriorate flatness of the finished film. Drying under high temperature is preferably carried out when the residual solvent amount is not more than 8% by mass. Throughout the entire step, drying is generally carried out at from 40° C. to 250° C., but is preferably carried out at 40 to 160° C.

When a tenter stretching apparatus is employed, an apparatus is preferably employed in which employing the holding means on the right side and the left side thereof; the film holding length (the distance from the holding initiation to the holding termination) can be controlled at the right side and at the left side. Further, in order to improve flatness, it is preferred that zones, which differ in temperature, are intentionally provided in the apparatus.

Further, it is also preferred that a neutral zone is provided between the temperature different zones so that no interference is produced between the adjacent zones.

Stretching operation may be carried out divided into multiple stages. It is preferable to carry out biaxial stretching in the casting direction as well as in the transverse direction. Further, when biaxial stretching is carried out, the biaxial stretching may be carried out simultaneously or stepwise.

In the "stepwise" stretching, stretching may be sequentially carried out which differs in the stretching direction or stretching may be carried out in which stretching in the same direction is carried out divided in multiple stages, and at the same time stretching in different direction is carried out in any of the multiple stages. That is, for example, the following stretching steps can be carried out.

Stretching in the casting direction—stretching in the transverse direction—stretching in the casting direction—stretching in the casting direction Stretching in the transverse direction—stretching in the transverse direction—stretching in the casting direction—stretching in the casting direction Further, the simultaneous biaxial stretching includes a case where stretching is carried out in one direction and tension in another direction is relaxed to allow contraction. Stretching ratio in the simultaneous biaxial stretching is preferably in the range of from 1.01 to 1.5 in the transverse and longitudinal directions.

When tentering is carried out, the residual solvent amount in the web is preferably 20 to 100% by mass at the beginning of tentering. It is preferred that until the residual solvent amount in the web reaches at most 10% by mass, and preferably at most 5% by mass, drying is carried out while tentering.

Drying temperature during tentering is preferably from 30 to 160° C., more preferably from 50 to 150° C., and most preferably from 70 to 140° C.

During tentering, it is preferred in view of enhancement of film uniformity that ambient temperature distribution in the transverse direction is small. The temperature distribution in the transverse direction during tentering is in the range of preferably ±5° C., more preferably ±2° C., and most preferably ±1° C.

6) Winding Step

A winding step is one in which, after the residual solvent amount in the web reaches at most 2% by mass, the resulting web is wound as a film by a winding device. When the residual solvent amount is not more than 0.4% by mass, a film with excellent dimensional stability can be obtained. It is especially preferred that the film having a residual solvent amount of from 0.00 to 0.10% by mass is wound.

As the winding method, a method generally employed may be employed, and examples thereof include a constant torque method, a constant tension method, a tapered tension method, and an internal stress constant program tension control method. Any of these may be appropriately selected and employed.

The film, which is a substrate in the present invention, is preferably a long length one. Specifically, the film length is from about 100 m to about 5,000 m, and the film is generally in the roll form. Further, the film width is preferably from 1.3 to 4 m, and more preferably from 1.4 to 2 m.

The thickness of the film, which is a substrate in the present invention, is not more than 300 μm, preferably from 20 to 200 μm, and more preferably from 25 to 150 μm.

<Manufacturing Method of Substrate According to Melt Cast Film Formation Method>

A manufacturing method of the substrate in the invention according to a melt cast film formation method will be explained below.

<Manufacturing Step of Melted Pellet>

It is preferred that a composition containing a resin employed in melt-extrusion is kneaded and pelletized in advance.

The pelletization may be carried out employing a known method. For example, a composition containing a dry thermoplastic resin and additives such as a heat shrinkable material is supplied to an extruder through a feeder, kneaded in a single or twin screw extruder, extruded in the strand form and then cooled with water or air, followed Bugner et al. cutting, thereby obtaining a pellet.

It is important that raw materials are dried prior to the extrusion in order to prevent decomposition thereof. Particularly, cellulose ester is likely to absorb moisture, and therefore, it is preferred that cellulose ester is dried at a temperature of from 70° C. to 140° C. for not less than three hours in a vacuum dryer or a hot-air dehumidication dryer to give a moisture content of not more than 200 ppm, and preferably not more than 100 ppm.

Additives may be supplied to an extruder and mixed therein or may be individually supplied to an extruder employing an individual feeder. It is preferred that additives such as an anti-oxidant employed in a slight amount are in advance mixed for obtaining a uniform mixture.

The anti-oxidant may be mixed with a thermoplastic resin in the solid form. Further, a solution containing an anti-oxidant may be allowed to penetrate into a thermoplastic resin or may be jetted to a thermoplastic resin, whereby the anti-oxidant is mixed with a thermoplastic resin.

A vacuum nowter mixer is preferred since drying and mixing can be simultaneously carried out. It is preferred that a feeding portion or an outlet of a die which contacts air is placed under dehumidified air or $N^2$ gas atmosphere.

It is preferred that in an extruder, a resin is processed at low temperature while surpassing so that the resin can be pelletized without deterioration of the resin (molecular weight lowering, coloration, gelation and the like). For example, when a twin screw extruder is employed, it is preferred that a screw having a deep groove is employed and rotated in the same direction. A wheel engaging type extruder is preferred in performing uniform kneading.

A film is formed employing the pellet prepared as described above. However, raw materials in the form of powder are supplied without being pelletized to an extruder by a feeder and can be formed into a film.

<Step for Extruding Melted Mixture from Cooling Die to Cooling Roller>

The pellets prepared are melted at a melting temperature Tm of from about 200 to about 300° C. via a single screw or twin screw type extruder. After foreign matter being removed via filtration employing a leaf disk type filter, the melting mixture is co-extruded from a T die in the form of a film, solidified on a cooling roller, and cast while pressing the film employing an elastic touch roller.

While fed into an extruder from a feeding hopper, it is preferable to minimize oxidation decomposition under vacuum or reduced pressure or under an ambience of inert gases. Tm means a temperature at the vicinity of the die outlet portion of the extruder.

The die with flaws or foreign matter adhered occasionally produces streak-like defects. Such defects are called die lines. In order to decrease surface defects such as the die lines, a structure is preferred in which resin retaining portions are minimized in the pipe from the extruder to the die. It is also preferable to employ a die having minimal flaws on its interior surfaces or lip. Volatile components from resins are occasionally deposited on the periphery of the die, resulting in die lines.

It is preferred that the inner surface of the extruder and the die, in contact with melted resins, is modified to a surface in which the melted resins are difficult to adhere by reducing the surface roughness or employing materials of low surface energy. Specifically, there are mentioned those which are ground to have a surface roughness of not more than 0.2 S after chromium plating or thermal ceramic spraying.

The cooling roller is not specifically limited, and is made of a highly rigid metal roller and structured so that heat controllable heat medium or cooling medium flows in the interior thereof. The size is not limited as long as it is sufficiently large to cool the melt-extruded film. The diameter of the cooling roller is ordinarily from about 100 mm to about 1 m.

As surface materials of the cooling roller, there are mentioned carbon steel, stainless steel, aluminum, and titanium. Further, in order to increase the surface hardness or to improve peeling properties of resins, It is preferred that the surface treatments such as hard chromium plating, nickel plating, amorphous chromium plating, or thermal ceramic spraying are carried out.

The surface roughness of the cooling roller is preferably not more than 0.1 μm and more preferably not more than 0.05 μm in terms of Ra. The roller with smoother surface enables to make the surface of the resulting film smoother. It is preferred that the surface-treated surface is further ground to have the surface roughness as described above.

As an elastic touch roller, there can be employed a silicone rubber roller whose the surface is covered with a thin film metal sleeve, which is described in Japanese Patent O.P.I. Publication Nos. 03-124425, 08-24772, 07-100960, and 10-272676, WO 2005-028950, and Japanese Patent O.P.I. Publication Nos. 11-235747, 2002-36332, 2005-172940 and 2005-280217.

When a film is peeled from the cooling roller, it is preferred that film deformation is minimized by controlling the tension.

<Stretching Process>

The film obtained as described above, after passed through a process to contact the cooling rollers, can be stretched 1.01 to 3.0 times in at least one direction.

It is preferred that the film is stretched both in the longitudinal direction (film conveyance direction) and in the transverse direction (film width direction) by a magnification of from 1.01 to 2.0.

The stretching method is preferably carried out employing a conventional roller stretching machine or tenter. Particularly when the optical film serves also as a polarizing plate protective film, stretching in the transverse direction enables its lamination with a polarizing film in the roll form, which is preferred.

The optical film stretched in the transverse direction has the slow axis in the transverse direction.

The stretching ratio is ordinarily from 1.1 to 3.0, and preferably from 1.2 to 1.5, and the stretching temperature is ordinarily from Tg to (Tg+50° C.), and preferably from Tg to (Tg+50° C.), Tg being that of the resin constituting the film.

It is preferred that the film, controlled to have a temperature distribution uniform in the transverse and/or longitudinal direction, is stretched. The variation of the temperature is in the range of preferably ±2°, more preferably ±1°, and still more preferably ±0.5°.

In preparation of the substrate in the invention, the substrate is preferably a long length film. Specifically, the film length is from about 100 m to about 5,000 m, and the film is preferably in the roll form. Further, the film width is preferably from 1.3 to 4 m, and more preferably from 1.4 to 2 m.

(Metal Film)

In the invention, the reflective mirror for solar thermal power generation has a structure comprising a metal film and provided thereon, a substrate. This structure is obtained by a method adhering a metal film to a substrate, a method vapor depositing a metal to a substrate or a method plating a metal on a substrate.

The metal vapor deposition method, metal plating method or metal film adhesion method can be carried out by a conventional method.

The metal used for the metal film is preferably silver, aluminum or nickel, and especially preferably silver or aluminum. The thickness of the metal film is preferably from 0.1 to 100 μm and more preferably from 1 to 10 μm.

(Reflective Mirror for Solar Thermal Power Generation)

The reflective mirror for solar thermal power generation of the invention comprises a metal film and provided thereon, the substrate in the film form as described above, wherein sunlight enters from the substrate side and is reflected by the metal film.

The shape of the reflective mirror for solar thermal power generation differs due to a solar light and heat collection device employed. As the shape, there is, for example, a pallabola shape used in a point collection type or a cylindrical shape or a simple planar type each used in a line light collection type.

In order to obtain these shapes, the substrate may be molded into the shape described above, or the reflective mirror for solar thermal power generation may be provided on a mirror support having the shape described above.

The reflective mirror for solar thermal power generation of the invention is in the film form and light. Therefore, it can be preferably employed as a heliostat mirror for pursuing sunlight.

The reason that the reflective mirror for solar thermal power generation of the invention has excellent durability is not clear but is considered as follows.

The reflective surface of the metal film is protected by the substrate. Although the metal film expands and contracts due to weather changes, particularly temperature changes, the difference in expansion and contraction between the substrate and the metal film is extremely small in the substrate in the invention which is a film composed of MFC, which prevents deformation of the metal film.

It is preferred that the reflective mirror for solar thermal power generation of the invention has a moisture proof layer between the substrate and the metal film or has an anti-stain layer on the surface of the substrate opposite the metal film.

(Moisture Proof Layer)

The moisture proof layer in the invention minimizes deterioration of the substrate due to temperature variation, particularly humidity variation. As the moisture proof layer, a gas barrier layer with transparency to sunlight is preferably employed.

As the gas barrier layer, a layer containing a metal oxide, a metal nitride or a metal oxide nitride is preferably employed. The gas barrier layer is provided on a substrate and a metal film is provided on the gas barrier layer.

The layer containing a metal oxide, a metal nitride or a metal oxide nitride refers to a layer containing the metal oxide, metal nitride or metal oxide nitride as the main components, and to a layer containing the metal oxide, metal nitride or metal oxide nitride in an amount of not less than 80% based on the all the constituents.

As the metal oxide, metal nitride or metal oxide nitride, there are mentioned oxides, nitrides or metal oxide nitrides of at least metal selected from the group consisting of silicon, zirconium, titanium, tantalum, tungsten, aluminum, zinc, indium, chromium, vanadium, tin and niobium. Typical examples thereof include metal oxides such as silicon oxide, titanium oxide, tin oxide and alumina; metal nitrides such as silicon nitride; and metal oxide nitrides such as silicon oxide nitride and titanium oxide nitride. A metal oxide layer containing silicon oxide as the main component is especially preferred. Herein, the main component implies that the content of the main component in the moisture proof layer is not less than 80% by mass.

The layer containing a metal oxide, a metal nitride or a metal oxide nitride may be formed according to any methods including a sol gel method in which a coating solution is coated, a vacuum deposition method, a sputtering method, and a CVD method (chemical deposition) but is preferably formed according to plasma treatment at atmospheric pressure or approximately atmospheric pressure.

That is, an atmospheric pressure plasma treatment which comprises exciting a reactive gas, an organometallic compound between opposed electrodes to be in a plasma state, and exposing a substrate to the reactive gas in the plasma state to form a film on the substrate is preferred, since it provides a dense film and enables control of film properties due to selection of the reactive gas or plasma generation conditions.

The silicon oxide is highly transparent, but in order to improve a gas barrier property such as a moisture barrier property, the moisture proof layer preferably contains a nitrogen atom. As the nitrogen atom source, silazane described later or a nitrogen gas can be employed.

When the nitrogen content in the layer is increased, the gas barrier property is enhanced, but light transmittance is lowered. Accordingly, silicon oxide nitride or titanium oxide nitride which does not lower light transmission is preferably employed. For example, when the silicon oxide nitride and titanium oxide nitride is represented by $SiO_xN_y$ and $TiO_xN_y$, respectively, such silicon oxide nitride or titanium oxide nitride is one in which x and y satisfy the relationship $0.4 \leq x/(x+y) \leq 0.8$. For example, SiN, in which x=0, scarcely transmits light.

The oxygen atom or nitrogen atom content can be measured employing XPS (ESCA LAB-200R produced by VG Scientific Co., Ltd.

The main component of the layer containing a metal oxide or metal nitride is preferably silicon oxide in view of low moisture penetrability.

It is preferred that employing a reactive gas containing inactive gas and a metal compound gas such as an organometallic gas, a metal hydride or the like, a layer containing a metal oxide or metal nitride is formed on a film substrate at atmospheric pressure or approximately at atmospheric pressure according to a plasma CVD method.

A compound such as an organometallic compound and a metal hydride compound may be in the form of gas, liquid, or solid at ordinary temperature and ordinary pressure. When they are gaseous at ordinary temperature and ordinary pressure, they can be introduced in the discharge space as they are. When they are liquid or solid, they are gasified via means such as heating, pressure reduction or ultrasonic wave radiation, and used. The above compound may be diluted with another solvent. The solvents include an organic solvent such as methanol, ethanol, n-hexane or a mixture thereof.

Incidentally, since these solvents are decomposed during plasma discharge treatment, their influence on the layer formed on the substrate can be neglected.

A layer composed of a metal oxide, (for example, silica), a metal nitride or a metal oxide nitride has a thickness of preferably from 70 nm to 1500 nm, and more preferably from 100 nm to 1000 nm, which provides a moisture proof property.

(Anti-stain Layer)

The anti-stain layer in the invention can minimize the adhesion of stains to a substrate and deterioration of the substrate. As the anti-stain layer, a transparent organic or inorganic layer is employed. As the inorganic layer, the same layer as the gas barrier layer as described above can be employed. As the organic layer, an organosilicon compound-containing layer is preferably employed, and as the organosilicon compound, those described in paragraphs 54 to 60 of Japanese Patent O.P.I. Publication No. 2005-219223 can be employed.

As the anti-stain layer formation method, a method described in paragraphs 60 to 64 of Japanese Patent O.P.I. Publication No. 2005-219223 is employed, whereby the anti-stain layer can be formed on the substrate.

The thickness of the anti-stain layer is preferably from 50 to 2000 nm, and more preferably from 100 to 1000 nm.

Of the anti-stain layers described above, the inorganic layer is preferably used as the anti-stain layer.

In the reflective mirror for solar thermal power generation of the invention, an anti-corrosive layer may be provided on the surface of the metal film opposite the substrate. As the anti-corrosive layer, a resin layer such as a polyolefin resin layer or a polyester resin layer can be employed.

EXAMPLES

Next, the present invention will be explained employing examples, but the invention is not specifically limited thereto.

Example 1

(Preparation of Reflective Mirror 1)
<Preparation of Substrate>

Firstly, MFC and its dispersion solution were prepared according to the following procedures.
(Preparation of MFC Dispersion Solution 1)

A needle leaf tree kraft pulp NDP-1 produced by Nippon Seishi Chemical Co., Ltd. was subjected to pulverization treatment in a high pressure homogenizer to give an average fiber diameter of not more than 1 μm. The aqueous suspension solution was subjected to a process in a grinder "KM1-10" (produced by Kurita Kikai Seisakusho Co., Ltd.) in which the suspension solution was passed through between the discs contacting each other and rotating at 1200 rpm from the center towards outside, and the process was repeated 30 times (30 pass was carried out). The resulting suspension was dried to obtain a bulk-shaped cellulose. The bulk-shaped cellulose was incorporated in methylene chloride, and dispersed in a high pressure homogenizer to obtain a dispersion solution. The resulting dispersion solution was concentrated to give a solid content of 50% by mass. Thus, MFC dispersion solution 1 was prepared.

Subsequently, the following dope comprising MFC dispersion solution 1 was prepared. Employing the dope, a substrate film with a thickness of 80 μm and a length of 5000 m was prepared according to a solution cast method.
(Preparation of Dope)

| | |
|---|---|
| Triacetyl cellulose | 100 parts by mass |
| MFC dispersion solution 1 | 80 parts by mass (40 parts by mass in terms of MFC solid) |

-continued

| | |
|---|---|
| Plasticizer (Trimethylolpropane tribenzoate) | 10 parts by mass |
| UV absorbent (TINUVIN 109 produced by Ciba Japan Co., Ltd.) | 2 parts by mass |
| Methylene chloride | 300 parts by mass |
| Ethanol | 40 parts by mass |

A gas barrier layer (moisture proof layer and anti-stain layer) with a thickness of 70 nm, composed of SiOx (x=1.8, measured by XPS), was formed on both surface sides of the substrate film obtained above in a plasma generation sputter roll coat apparatus, wherein Si was employed as a target in DC magnetron sputter and an argon gas and an oxygen gas were employed as the processing gases at a film formation temperature of 180° C. in reactive sputter. The thickness of the gas barrier layer was adjusted according to the reaction period of time.

<Preparation of Metal Layer>

The resulting substrate film with the gas bather film formed thereon was subjected to development treatment at 25° C. for 60 seconds employing the following developer (D-1), then to physical development treatment (electroless plating treatment) at 45° C. for 60 seconds employing the following physical developer (P-1), then to fixing treatment at 25° C. for 120 seconds employing the following fixer (F-1), then to washing for 5 minutes in a 40° C. hot water, then to drying for 30 minutes employing a 40° C. hot air and finally to cross-linking treatment employing a cross-linking agent (C-1) to form a metal film layer on one side of the substrate film. Thus, a reflective mirror 1 was prepared.

(Developer D-1)

| | |
|---|---|
| Pure water | 500 ml |
| Metol | 2 g |
| Anhydrous sodium sulfite | 80 g |
| Hydroquinone | 4 g |
| Borax | 4 g |
| Sodium thiosulfate | 10 g |
| Potassium bromide | 0.5 g |

Water was added to make a 1 liter solution.
(Physical Developer P-1)

One liter of an aqueous solution containing 5 g of hydroquinone and 10 g of citric acid and 1 liter of an aqueous solution containing 35 g of silver nitrate were mixed. The resulting mixture aqueous solution was employed as physical developer P-1 within 30 minute after the mixing.

(Fixer F-1)

| | |
|---|---|
| Pure water | 750 ml |
| Sodium thiosulfate | 250 g |
| Anhydrous sodium sulfite | 15 g |
| Glacial acetic acid | 15 ml |
| Potassium alum | 15 g |

Water was added to make a 1 liter solution.
(Cross-linking Agent C-1)

| | |
|---|---|
| Pure water | 750 ml |
| Glutaraldehyde | 15 g |

(Preparation of Reflective Mirror 2)

A reflective mirror 2 was prepared in the same manner as in reflective mirror 1, except that an acryl resin with a mass average molecular weight of 220,000 containing a methacrylate unit and an acrylate unit (95:5 by mole ratio) was used instead of the triacetyl cellulose in the dope.

(Preparation of Reflective Mirror 3)

A reflective mirror 3 was prepared in the same manner as in reflective mirror 1, except that the MFC dispersion solution 1 was not contained in the dope.

(Preparation of Reflective Mirror 4)

A mixture composition composed of the following components was melted at 200° C., and then cooled to 20° C. Employing the cooled composition, a plate with a size of 50 cm×50 cm and with a thickness of 20 cm was prepared. A silver metal film was formed on the surface of the resulting plate in the same manner as in reflective mirror 1.

| | |
|---|---|
| Triacetyl cellulose | 100 parts by mass |
| MFC dispersion solution 1 (employed in reflective mirror 1) | 40 parts by mass |
| Plasticizer (Trimethylolpropane tribenzoate) | 10 parts by mass |
| UV absorbent (TINUVIN 109 produced by Ciba Japan Co., Ltd.) | 2 parts by mass |

(Evaluation of Durability)

A reflectance D1 of the reflective mirror 1, which is a reflectance of light with a wavelength of from 400 to 800 nm reflected from the substrate film of the reflective mirror 1 (the surface of the substrate film opposite the metal layer), was measured employing a densitometer installed with an integrated sphere. Further, after the reflective mirror 1 was allowed to stand for 24 hours under the following conditions, a reflectance D2 of the reflective mirror 1 was measured in the same manner as above. Then, a deterioration degree of reflectance (D2/D1) was determined and evaluated as a measure of durability.

Conditions:

The reflective mirror was placed in a cycling thermostatic chamber in which an atmosphere of −20° C. and an atmosphere of 90° C. were alternately repeated every three hours (an atmosphere of −20° C. was maintained for 30 minutes and an atmosphere of 90° C. for 30 minutes). When the atmosphere of 90° C. was maintained for 30 minutes, a 90° C. air with a humidity of 100% was blown onto the substrate film of the mirror from a position 30 cm distant from the substrate film at a blowing speed of 10 m/second.

The D2/D1 of the reflective mirrors 2, 3 and 4 was determined in the same manner as in the reflective mirror 1. With respect to the reflective mirror 4, the air was blown onto the reflective mirror from the metal layer side (the same side as the metal layer of the substrate), and a reflectance from the metal layer side was measured.

The deterioration degree of reflectance was evaluated according to the following criteria. Rankings A and B were evaluated as practically useful. The results are shown in Table 1.

A: The deterioration degree of reflectance is from 0.98 to 1.00.
B: The deterioration degree of reflectance is from 0.95 to less than 0.98.
C: The deterioration degree of reflectance is from 0.90 to less than 0.95.
D: The deterioration degree of reflectance is from 0.80 to less than 0.90.
E: The deterioration degree of reflectance is less than 0.80.

TABLE 1

| Mirror No. | Resin Used | MFC | Metal Layer | Deterioration Degree of Reflectance | Remarks |
| --- | --- | --- | --- | --- | --- |
| 1 | Triacetyl Cellulose | Present | Ag | A | Inv. |
| 2 | Acryl Resin | Present | Ag | A | Inv. |
| 3 | Triacetyl Cellulose | None | Ag | E | Comp. |
| 4 | Triacetyl Cellulose | Present | Ag | C | *Comp. |

Inv.: Inventive,
Comp.: Comparative
*The metal layer side surface is the reflection surface.

As is apparent from Table 1, the inventive reflective mirrors for solar thermal power generation provide excellent durability.

Example 2

(Preparation of Reflective Mirror 11)
<Preparation of Substrate>
Firstly, MFC and its dispersion solution were prepared according to the following procedures.
(Preparation of MFC Dispersion Solution 1)
A needle leaf tree kraft pulp NDP-1 produced by Nippon Seishi Chemical Co., Ltd. was subjected to pulverization treatment in a high pressure homogenizer to give an average fiber diameter of not more than 1 μm. The aqueous suspension solution was subjected to a process in a grinder "KM1-10" (produced by Kurita Kikai Seisakusho Co., Ltd.) in which the suspension solution was passed through between the discs contacting each other and rotating at 1200 rpm from the center towards outside, and the process was repeated 30 times (30 pass was carried out). The resulting suspension was dried to obtain a bulk-shaped cellulose. The bulk-shaped cellulose was incorporated in methylene chloride, and dispersed in a high pressure homogenizer to obtain a dispersion solution. The resulting dispersion solution was concentrated to give a solid content of 50% by mass.

Subsequently, the following dope comprising MFC dispersion solution 1 was prepared. Employing the dope, a substrate film with a thickness of 80 μm and a length of 5000 m was prepared according to a solution cast method.
(Preparation of Dope)

| | |
| --- | --- |
| Triacetyl cellulose | 100 parts by mass |
| MFC dispersion solution 1 | 80 parts by mass (40 parts by mass in terms of MFC solid) |
| Plasticizer | 10 parts by mass |

(Trimethylolpropane tribenzoate)

| | |
| --- | --- |
| UV absorbent (TINUVIN 109 produced by Ciba Japan Co., Ltd.) | 2 parts by mass |
| Methylene chloride | 300 parts by mass |
| Ethanol | 40 parts by mass |

<Preparation of Metal Layer>
The resulting substrate film was subjected to development treatment at 25° C. for 60 seconds employing the following developer (D-1), then to physical development treatment (electroless plating treatment) at 45° C. for 60 seconds employing the following physical developer (P-1), then to fixing treatment at 25° C. for 120 seconds employing the following fixer (F-1), then to washing for 5 minutes employing a 40° C. hot water, then to drying for 30 minutes employing a 40° C. hot air, and finally to cross-linking treatment employing a cross-linking agent (C-1) to form a metal film layer on one side of the substrate film. Thus, a reflective mirror 11 was prepared.
(Developer D-1)

| | |
| --- | --- |
| Pure water | 500 ml |
| Metol | 2 g |
| Anhydrous sodium sulfite | 80 g |
| Hydroquinone | 4 g |
| Borax | 4 g |
| Sodium thiosulfate | 10 g |
| Potassium bromide | 0.5 g |

Water was added to make a 1 liter solution.
(Physical Developer P-1)
One liter of an aqueous solution containing 5 g of hydroquinone and 10 g of citric acid and 1 liter of an aqueous solution containing 35 g of silver nitrate were mixed. The resulting mixture aqueous solution was employed as physical developer P-1 within 30 minute after the mixing.
(Fixer F-1)

| | |
| --- | --- |
| Pure water | 750 ml |
| Sodium thiosulfate | 250 g |
| Anhydrous sodium sulfite | 15 g |
| Glacial acetic acid | 15 ml |
| Potassium alum | 15 g |

Water was added to make a 1 liter solution.
(Cross-linking Agent C-1)

| | |
| --- | --- |
| Pure water | 750 ml |
| Glutaraldehyde | 15 g |

(Preparation of Reflective Mirror 12)
A reflective mirror 12 was prepared in the same manner as in reflective mirror 11, except that a moisture proof layer as described below was formed between the substrate film and the metal layer.

A gas barrier layer (moisture proof layer) with a thickness of 70 nm, composed of SiOx (x=1.8, measured by XPS), was formed on both surface sides of the substrate film in a plasma generation sputter roll coat apparatus, wherein Si was employed as a target in DC magnetron sputter, and an argon gas and an oxygen gas were employed as the processing gases at a film formation temperature of 180° C. in reactive sputter. The thickness of the gas bather layer was adjusted according to the reaction period of time.
(Preparation of Reflective Mirror 13)
A reflective mirror 13 was prepared in the same manner as in reflective mirror 11, except that an acryl resin with a mass average molecular weight of 220,000 containing a methacrylate unit and an acrylate unit (95:5 by mole ratio) was used instead of the triacetyl cellulose in the dope.
(Preparation of Reflective Mirror 14)
A reflective mirror 14 was prepared in the same manner as in reflective mirror 12, except that an acryl resin with a mass average molecular weight of 220,000 containing a methacrylate unit and an acrylate unit (95:5 by mole ratio) was used instead of the triacetyl cellulose in the dope.

(Preparation of Reflective Mirror 15)

A reflective mirror 15 was prepared in the same manner as in reflective mirror 11, except that the MFC was not contained in the dope.

(Preparation of Reflective Mirror 16)

A reflective mirror 16 was prepared in the same manner as in reflective mirror 12, except that the MFC was not contained in the dope.

(Preparation of Reflective Mirror 17)

A reflective mirror 17 was prepared in the same manner as in reflective mirror 13, except that the MFC was not contained in the dope.

(Preparation of Reflective Mirror 18)

A reflective mirror 18 was prepared in the same manner as in reflective mirror 14, except that the MFC was not contained in the dope.

(Preparation of Reflective Mirror 19)

A reflective mirror 19 was prepared in the same manner as in reflective mirror 12, except that the UV absorbent was not contained in the dope.

(Preparation of Reflective Mirror 20)

A mixture composition composed of the following components was melted at 200° C., and then cooled to 20° C. Employing the cooled composition, a film with a size of 50 cm×50 cm and with a thickness of 80 μm was prepared. A silver metal film was formed on the surface of the resulting film in the same manner as in reflective mirror 11 to prepare a reflective mirror 20.

| | |
|---|---|
| Triacetyl cellulose | 100 parts by mass |
| MFC employed in reflective mirror 1 | 40 parts by mass |
| Plasticizer (Trimethylolpropane tribenzoate) | 10 parts by mass |
| UV absorbent | 2 parts by mass |

(TINUVIN 109 Produced by Ciba Japan Co., Ltd.)

(Preparation of Sunlight Collecting Mirror)

Each of the reflective mirrors 11 through 19 was adhered to a stainless steel (SUS 304) plate with a length in the longitudinal direction of 4 cm, a length in the transverse direction of 5 cm and a thickness of 0.1 mm through an adhesion layer with a thickness of 3 μm so that the substrate film is further from the stainless steel plate than the metal film, thereby preparing sunlight collecting mirrors 11 through 19, respectively. Further, a sunlight collecting mirror 20 was prepared in the same manner as above, except that the reflective mirror 20 was adhered to the stainless steel so that the metal film is further from the stainless steel plate than the substrate film.

[Evaluation]

The sunlight collecting mirrors obtained above were evaluated for specular reflectance, weather resistance and light resistance according to the following methods.

<Measurement of Specular Resistance>

A spectrophotometer "UV 265" produced by Shimazu Seisakusho Co., Ltd. installed with an integrating sphere reflection device was modified and adjusted so that an incident angle of incident light is 5° with respect to the normal of a reflective mirror. A specular reflectance of light with a reflection angle of 5° was measured through the modified spectrophotometer. An average reflectance of lights with a wavelength of from 350 to 700 nm was determined.

<Weather Resistance Test (Variation of Specular Reflectance)>

Each mirror was allowed to stand for 30 days at 85° C. and at 85% RH. Thereafter, the specular reflectance of the resulting mirror was measured according to the same method as the light reflectance measurement above. Thus, the specular reflectances of the mirror before and after the enforced deterioration test were measured, and a deterioration rate of the specular reflectance of the mirror was determined from the ratio thereof. The weather resistance was evaluated according to the following criteria. Rankings A and B were evaluated as practically useful. The results are shown in Table 2.

A: The deterioration rate of specular reflectance is less than 5%.
B: The deterioration rate of specular reflectance is from 5% to less than 10%.
C: The deterioration rate of specular reflectance is from 10% to less than 15%.
D: The deterioration rate of specular reflectance is from 15% to less than 200%.
E: The deterioration rate of specular reflectance is not less than 20%.

<Light Resistance Test (Variation of Specular Reflectance)>

Each mirror was irradiated with ultraviolet rays for 7 days at 65° C. employing an EYE SUPER UV TES1ER produced by Iwasaki Denki Co., Ltd. The specular reflectances of the mirror before and after the ultraviolet ray irradiation were measured in the same manner as above, and a deterioration rate of specular reflectance of the mirror was determined in the same manner as above. The light resistance was evaluated according to the following criteria. Rankings A and B were evaluated as practically useful. The results are shown in Table 2.

A: The deterioration rate of specular reflectance is less than 5%.
B: The deterioration rate of specular reflectance is from 5% to less than 10%.
C: The deterioration rate of specular reflectance is from 10% to less than 15%.
D: The deterioration rate of specular reflectance is from 15% to less than 200%.
E: The deterioration rate of specular reflectance is not less than 20%.

<Pencil Hardness Test>

A pencil hardness of each mirror at an angle of 45° and at a load of 1 kg was measured based on JIS-K4500, and evaluated as one measure of durability. The results are shown in Table 2.

As is apparent from Table 2, the inventive reflective mirrors for solar thermal power generation provide excellent weather resistance and light resistance as well as high surface hardness, showing excellent durability.

TABLE 2

| Reflective Mirror No. | Resin | MFC | Anti-stain Layer, Moisture Proof Layer | UV Absorbent | Specular Reflectance Weather Resistance | Light Resistance | Pencil Hardness | Remarks |
|---|---|---|---|---|---|---|---|---|
| 11 | Triacetyl Cellulose | Present | Absent | Present | B | B | H | Inventive |
| 12 | Triacetyl Cellulose | Present | Present | Present | A | A | 3H | Inventive |
| 13 | Acryl Resin | Present | Absent | Present | B | B | H | Inventive |

TABLE 2-continued

| Reflective Mirror No. | Resin | MFC | Anti-stain Layer, Moisture Proof Layer | UV Absorbent | Specular Reflectance Weather Resistance | Light Resistance | Pencil Hardness | Remarks |
|---|---|---|---|---|---|---|---|---|
| 14 | Acryl Resin | Present | Present | Present | A | A | 3H | Inventive |
| 15 | Triacetyl Cellulose | Absent | Absent | Present | E | E | not more than 2B | Comparative |
| 16 | Triacetyl Cellulose | Absent | Present | Present | D | D | not more than 2B | Comparative |
| 17 | Acryl Resin | Absent | Absent | Present | E | E | not more than 2B | Comparative |
| 18 | Acryl Resin | Absent | Present | Present | D | D | not more than 2B | Comparative |
| 19 | Triacetyl Cellulose | Present | Present | Absent | B | B | H | Inventive |
| 20 | Triacetyl Cellulose | Present | Present | Present | E | C | 3H | Comparative (Light enters from the base material side.) |

Explanation of Symbols
1. Metal Film
2. Substrate
3. Moisture Proof Layer
4. Anti-stain Layer
10. Mirror for Solar Thermal Power Generation

The invention claimed is:

1. A reflective mirror for solar thermal power generation comprising:
a metal film and provided thereon, a substrate, the reflective mirror reflecting sunlight entering from the substrate side, and an anti-stain layer being provided on the side of the substrate opposite the metal film, wherein the substrate is a film composed of a resin containing microfibrillated cellulose.

2. The reflective mirror for solar thermal power generation of claim 1, wherein a moisture proof layer is provided between the substrate and the metal film.

3. The reflective mirror of claim 1, wherein the microfibrillated cellulose is a cellulose fiber having an average fiber diameter of 4 to 200 nm.

4. The reflective mirror of claim 1, wherein the resin comprises a cellulose ester resin.

5. The reflective mirror of claim 4, wherein the cellulose ester resin comprises cellulose acetate propionate or cellulose acetate butyrate.

6. The reflective mirror of claim 1, wherein the resin comprises an acryl resin.

7. The reflective mirror of claim 6, wherein the acryl resin comprises a methacrylate resin.

8. The reflective mirror of claim 7, wherein the methacrylate resin comprises a copolymer composed of 50 to 99% by mass of a methyl methacrylate unit and 1 to 50% by mass of another monomer unit.

9. The reflective mirror of claim 1, wherein the resin comprises a cyclic olefin resin.

10. The reflective mirror of claim 9, wherein the cyclic olefin resin comprises a norbornene based resin.

11. A reflective mirror for solar thermal power generation comprising:
a metal film and provided thereon, a substrate, the reflective mirror reflecting sunlight entering from the substrate side, and a moisture proof layer being provided between the substrate and the metal film, wherein the substrate is a film composed of a resin containing microfibrillated cellulose.

12. The reflective mirror of claim 11, wherein the microfibrillated cellulose is a cellulose fiber having an average fiber diameter of 4 to 200 nm.

13. The reflective mirror of claim 11, wherein the resin comprises a cellulose ester resin.

14. The reflective mirror of claim 13, wherein the cellulose ester resin comprises cellulose acetate propionate or cellulose acetate butyrate.

15. The reflective mirror of claim 11, wherein the resin comprises an acryl resin.

16. The reflective mirror of claim 15, wherein the acryl resin comprises a methacrylate resin.

17. The reflective mirror of claim 16, wherein the methacrylate resin comprises a copolymer composed of 50 to 99% by mass of a methyl methacrylate unit and 1 to 50% by mass of another monomer unit.

18. The reflective mirror of claim 11, wherein the resin comprises a cyclic olefin resin.

19. The reflective mirror of claim 18, wherein the cyclic olefin resin comprises a norbornene based resin.

* * * * *